US008745166B2

(12) United States Patent
Faith et al.

(10) Patent No.: US 8,745,166 B2
(45) Date of Patent: Jun. 3, 2014

(54) GATEWAY SERVICE PLATFORM

(75) Inventors: Patrick Faith, Pleasanton, CA (US); Mark Carlson, Half Moon Bay, CA (US); Krishna Prasad Koganti, Cupertino, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 539 days.

(21) Appl. No.: 12/473,708

(22) Filed: May 28, 2009

(65) Prior Publication Data

US 2009/0319638 A1 Dec. 24, 2009

Related U.S. Application Data

(60) Provisional application No. 61/056,736, filed on May 28, 2008.

(51) Int. Cl.
*G06F 15/16* (2006.01)
*G06F 17/30* (2006.01)
*G06Q 30/06* (2012.01)

(52) U.S. Cl.
CPC ............ *G06Q 30/06* (2013.01); *G06Q 30/0601* (2013.01)
USPC .......................................... 709/219; 709/218

(58) Field of Classification Search
CPC .......... G06Q 30/00; G06F 15/00; G06F 17/00
USPC .................................................. 709/219, 218
See application file for complete search history.

(56) References Cited

U.S. PATENT DOCUMENTS 6,131,087 A * 10/2000 Luke et al. ...................... 705/80
6,745,259 B2 6/2004 Wagner
2003/0046383 A1 * 3/2003 Lee et al. ....................... 709/224
2003/0078042 A1 * 4/2003 Miriyala et al. ............... 455/435
2003/0161335 A1 * 8/2003 Fransdonk ..................... 370/401
2006/0031309 A1 * 2/2006 Luoffo et al. .................. 709/206

(Continued)

FOREIGN PATENT DOCUMENTS

KR 10-2003-0082090 A 10/2003
KR 10-2004-0093582 A 11/2004

OTHER PUBLICATIONS

Search/Examination Report dated Jan. 29, 2010 from International Application No. PCT/US2009/045493, 11 pages.

(Continued)

*Primary Examiner* — Thomas Dailey
*Assistant Examiner* — Ebrahim Golabbakhsh
(74) *Attorney, Agent, or Firm* — Kilpatrick Townsend & Stockton LLP

(57) ABSTRACT

A gateway service platform is disclosed that provides access to a payment processing system via an open network such as the internet. The gateway service platform also provides access to service systems that provide a variety of services and applications offered by or affiliated with the payment processing system. The gateway service platform allows the payment processing system to reach users and to facilitate transactions on a wide variety of devices that may not otherwise be able to connect to payment processing system. Other devices, such as payment terminal devices, can also interact with a payment processing system through the gateway service platform using the same network and protocol. Embodiments of the invention allow devices on these open networks to connect with the payment processing system without having to change the existing infrastructure of the payment processing system.

23 Claims, 20 Drawing Sheets

(56) References Cited

U.S. PATENT DOCUMENTS

| | | |
|---|---|---|
| 2007/0130062 A1 | 6/2007 | Hum |
| 2007/0255653 A1* | 11/2007 | Tumminaro et al. ............ 705/39 |
| 2008/0103923 A1 | 5/2008 | Rieck et al. |
| 2008/0169344 A1* | 7/2008 | Huh .............................. 235/380 |
| 2008/0207234 A1* | 8/2008 | Arthur et al. .................. 455/466 |
| 2009/0099961 A1* | 4/2009 | Ogilvy ............................ 705/39 |
| 2009/0119190 A1* | 5/2009 | Realini ........................... 705/30 |
| 2009/0287604 A1* | 11/2009 | Korgav et al. ................... 705/40 |
| 2010/0299433 A1* | 11/2010 | De Boer et al. ............... 709/224 |
| 2011/0106934 A1* | 5/2011 | Sadasivan et al. ............ 709/223 |
| 2011/0295730 A1* | 12/2011 | Vaswani et al. ................. 705/34 |

OTHER PUBLICATIONS

Examination Report No. 1, issued on Dec. 16, 2013 in Australian Patent Application No. 2009260473 filed May 28, 2009, 5 pages.

\* cited by examiner

GATEWAY SERVICE PLATFORM

CROSS-REFERENCES TO RELATED APPLICATIONS

The present application claims the benefit of priority under 35 U.S.C. §119 from U.S. Provisional Patent Application Ser. No. 61/056,736, entitled "IP Gateway Platform," filed on May 28, 2008, the disclosure of which is hereby incorporated by reference in its entirety for all purposes.

BACKGROUND

The present application discloses systems and methods that improve the distribution capabilities, the ease of development, and the integration of services and applications associated with a payment processing system.

Services and applications associated with a payment processing system have traditionally been implemented using a "Silo Framework." In a Silo Framework, each service and application independently implements each layer of the service and each service individually integrates with the payment processing network. For example, each service or application implemented using a Silo Framework uses their own firewall layer, database layer, and connection interfaces to the internet, telecommunication networks, and payment processing networks.

Many inefficiencies exist when using a Silo Framework to implement services and applications. As services and applications are developed piecemeal over time, each independently implemented layer of a silo creates unnecessary redundancy between the services and applications. For example, each service may maintain its own firewall, database resources, and other modules used to provide the service. This phenomenon occurs even if multiple layers of the silos accomplish the same basic function for each service and application. Not only is this an efficient use of development resources, but it also makes it more difficult to effectively integrate various services and applications. Additionally, differences between various implementations of the layers inevitably develop over time. As a result, there is often no single common interface that devices can use to access these various services and applications. Consequently, it is more difficult for new services to be developed and adopted by users. It is also more difficult to integrate various services because there is no common way that all of these services carry out common tasks. As a result, implementing new combinations of various services can be difficult and potentially time-consuming.

Another related problem that with the Silo Framework is that when a single change to more than one service is to be made, each service may have to have its infrastructure individually modified. For example, if some services want to adopt support for a new technology, then each affected service would have to make the necessary adjustments to accommodate the new technology. This becomes quite burdensome as the number of affected services grows. As a result, the process of updating and maintaining services may become slower and potentially may not happen at all.

Yet another problem with the Silo Framework is that it becomes cumbersome to expand access to a payment processing network to a wide variety of access points, because each service or application has to be individually configured to support each new means of access. Historically, this problem has not been much of an issue, because access to a payment processing system has typically been controlled by a limited number of processing parties that act as the gatekeepers to the payment processing system. These processing parties work with issuers and acquirers to provide access to a payment processing system and generally use a dedicated network connection to access the payment processing system.

Over time, all of these inefficiencies have become more significant. Not only has the number of new services, applications, and features increased over time, but there is also a growing need to be able to access these services and applications over channels beyond the ones controlled by the limited number of processing parties. As the number of services and applications increase along with the number of channels used to access these services, the inefficiencies of the Silo Framework becomes more and more significant. As a result of all of this, a new framework is needed to provide access to a payment processing system and to provide various services and applications associated with payment processing systems.

These problems, as well as other problems, are addressed by embodiments of the present invention.

SUMMARY

Systems and methods for improved methods and payment processing systems are disclosed.

According to one embodiment, a gateway service system is used to provide services related to an account held by a user. The gateway service system comprises a number of different components or subsystems. One component is a gateway tier configured to communicate with devices over one or more open networks. Additionally, the gateway service system has two or more service systems, wherein the two or more service systems are communicatively coupled to the gateway tier and wherein the two or more service systems are configured to communicate with devices over the one or more open networks via the gateway tier. The two or more service systems are also configured to communicate with a payment processing system. The two or more service systems are further configured to provide a plurality of services related to an account held by a user. The plurality of services is provided to users using devices connected to the one or more open networks. According to some embodiments, the two or more service systems are integrated with each other in a way to provide new functionality for one or more of the integrated services.

According to another embodiment, a method for providing services related to an account held by a user is disclosed. The first step of this method involves receiving at a gateway provided by a server computer a request from a device to access a service, wherein the request is received an open network. Next, the request is sent to a service system provided by a server computer. The service system is one of a plurality of service systems communicatively coupled to the gateway. The service system is also communicatively coupled to a payment processing system and configured to provide a one or more of services related to an account held by a user. Finally, a response is sent from the service system to the device. According to some embodiments, one or more of the plurality of service systems are integrated with each other to provide new functionality for one or more of the integrated services. Additionally, the above-described method can be embodied as control logic residing on a computer-readable medium so that a computer with a processor can execute the steps of the method.

Further details regarding embodiments of the invention are provided below.

DETAILED DESCRIPTION

Figure 1:
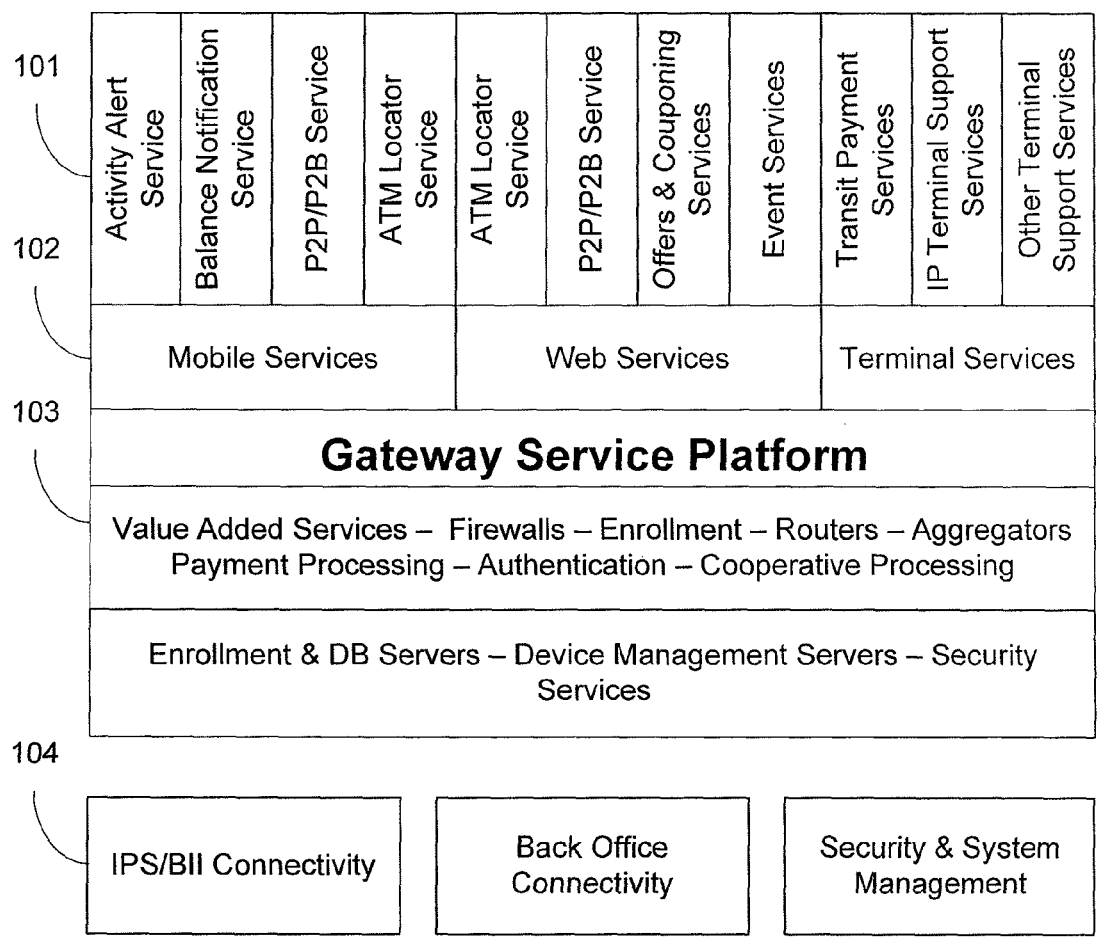
FIG. 1 illustrates exemplary services that can be implemented using a gateway service platform according to an embodiment of the present invention.

One embodiment of the invention uses a gateway service platform to provide access to a payment processing system via an open network such as the internet. The gateway service platform also provides access to and helps integrate service systems that provide a variety of services and applications offered by or affiliated with the payment processing system. The gateway service platform allows the payment processing system to reach users and to facilitate transactions on a wide variety of devices that may not otherwise be able to connect to payment processing system. For example, one embodiment of the invention allows web-based and mobile-based devices to use the internet and Internet Protocol (IP), as the network and communication protocol respectively, to connect to the payment processing system without using the services of a processing party. Other devices, such as payment terminal devices, can also interact with a payment processing system through the gateway service platform using the same network and protocol. Gateway service platforms can take incoming requests from devices over a network and pass the request on to a payment processing system for processing. Gateway service platforms can then take the response from the payment processing system and deliver the response back to the device. This embodiment of the invention allows the devices on these open networks to connect with the payment processing system without having to change the existing infrastructure of the payment processing system.

Embodiments of the gateway service platform can also help integrate various services and applications so that new functionality can be consistently and quickly implemented by services and applications. For example, services that push alerts or other notifications, such as an activity alert service or a balance notification services, can be integrated with each other so that users can configure a common set of preferences for how these services can push information out to the user. Additionally, these services can use a common interface or protocol for pushing information out to users. Services that may wish to implement new features that push information out to users, such as a P2P Service, a couponing service, or other services, can integrate with the notification infrastructure created by services such as an activity alert service to more quickly and efficiently implement new features.

Another embodiment of the invention uses multiple gateway service platforms located at various locations around the world to provide access to a payment processing system. These gateway service platforms also provide access to the service systems that provide services and applications offered by or affiliated with the payment processing system. Additionally, each gateway service platform can serve devices located in a large geographic area. The gateway service platforms can also be used to provide redundancy in the network so that the network can better handle failures that may occur at a given gateway.

Embodiments of the invention allow for a number of improvements over the prior systems and methods used to access payment processing systems and their related services and applications. One improvement offered by the embodiments of the invention is that the various services and applications offered by a payment processing system have a unified and common means for providing access to their services via a commonly available network such as the internet. As new services and applications have been added over time, they have often been developed independently of each other. As a result, if and when these new services and applications develop the ability for devices to access portions of the services over networks such as the internet, each service or application built their own independent infrastructure to support such access. This independent development not only creates unnecessary redundancy of backend systems, but also results in many different interfaces and protocols for accessing the services and applications. Embodiments of the present invention improve this situation by offering a unified means for providing access to the various services and applications offered by payment processing systems. Embodiments of the invention also allow for quick and easy access to services over commonly used networks. Additionally, a more unified implementation of services and applications makes it easier to integrate services and applications to take advantage of potentially synergetic relationships between offered services and applications.

Another improvement offered by embodiments of invention is easier access to a payment processing system and its related services and applications. Embodiments of the invention offer easier access by using commonly available networks and technologies, such as the internet and IP. Prior systems and methods for accessing payment processing systems often required parties, such as merchants, to configure special access to an otherwise closed network. For example, merchants wishing to access a payment processing system would typically need a special connection setup and configured so that the merchants could process transactions using the payment processing system. Embodiments of the gateway service platform allow for merchants to process transactions using a payment processing system via a standard internet connection that is easy to setup and widely available. Additionally, access to any services or applications associated with the payment processing system can also be provided using the same widely available network connections.

Embodiments of the present invention improve on the above-described problems as well as offer other advantages as further described below.

I. Gateway Service Platform

A. Unified Framework Overview

FIG. 1 illustrates an example of a logical framework according to an embodiment of the present invention. As described herein, the embodiment illustrated in FIG. 1 offers a robust, fortified, and secure delivery channel for a variety of payment and non-payment services and applications. The embodiment illustrated in FIG. 1 can support many different channels. Such channels include internet channels, mobile channels, and traditional brick and mortar channels.

Various services and applications 101 are shown at the top layer of the diagram illustrated in FIG. 1.

The services and applications 101 illustrated in FIG. 1 are further grouped according to a classification of the particular service. System grouping 102 is shown with three types of services: Mobile Services, Web Services, and Terminal Services. A mobile service is an application that usually uses a mobile device and a mobile network as the channel for the application. Example mobile devices include cell phones and PDA's. A web service is an application that typically uses standard web browsers and the internet. A terminal service is an application typically associated with a terminal used to process payment transactions in a retail store or other similar setting. Other embodiments of the invention shown in FIG. 1 could easily be extended to support additional categories of services as needed.

Each of the systems represented in group 102 may use a different means for communicating with different devices. For example, a web service may use an internet connection provided by an Internet Service Provider (ISP) in order to connect to the gateway platform and a mobile device may be sent an SMS text message over a cellular network. Additionally, these various channels can sometimes overlap. For example, it is not uncommon for a mobile device to access the internet using a cellular network.

Gateway Service Layer 103 receives a communication that has been routed to the Gateway Service Layer 103 from a web service, mobile service, terminal service at layer 102. Gateway Service Layer 103 may analyze the received communication and take an appropriate action. For example, the Gateway Service Layer 103 may reformat the communication so that a legacy processing system can properly respond to the device that sent the communication. The Gateway Service Layer 103 may also respond to the communication itself.

The Gateway Service Layer 103 illustrated in FIG. 1 is shown with a variety of elements such as: Value Added Services, Firewalls, Enrollment, Routers, Authentication, Payment Processing, Aggregators, and Cooperative Processing. Each of these elements can be implemented through a variety of server computers that help make up the Gateway Service Layer 103. Additional details on these elements and how these elements can help process communications from devices are provided below.

The final layer illustrated in FIG. 1 illustrates a connection layer 104 that comprises connections to various networks, systems, or other modules that may be external to the Gateway Service Layer 103. In some embodiments, the networks, systems, or modules connected to the Gateway Service Layer through connection layer 104 are legacy networks or systems. In the embodiment illustrated in FIG. 1, a legacy payment processing system, such as VisaNet™, is connected to the Gateway Service Layer 103. Other payment processing systems could be used according to alternative embodiments. Gateway Service Layer 103 uses connection layer 104 to conduct transactions, forward requests and responses, or pass along any other data generated from devices to payment processing systems, merchants (via back office connectivity), or other connected networks or modules.

The capabilities offered by the embodiment illustrated in FIG. 1 allows for a number of additional advantages to be realized. For example, the embodiment illustrated in FIG. 1 allows for the easy creation of new connection options for payment transactions. It is also possible to expand the reach of payment processing systems to new payment originators and customers. Value added services can be delivered directly to cardholders, merchants, buyers, suppliers, or any other users of a payment processing system. The embodiment illustrated in FIG. 1 can easily integrate with new technology paradigms and Internet based services with open standards (e.g., XML). Additionally, the embodiment illustrated in FIG. 1 can integrate with existing payment processing systems without re-tooling existing infrastructure in the payment processing system and still maintain high levels of security, reliability, and redundancy. These capabilities arise, in part, because the Gateway Service Layer 103 is able to connect devices operating on a first network to a payment processing system operating on a second network. Payment processing systems, such as VisaNet™, are typically accessed using dedicated leased network lines that have been specifically configured to give access to the payment processing system. In other words, payment processing systems are typically accessed using a closed network. Embodiments of the system illustrated in FIG. 1 remove this restriction and allow for these new capabilities to be realized by eliminating the technology and payment hurdles created by a legacy environment. Additionally, the embodiment illustrated in FIG. 1 allows various services and applications to share common elements of their infrastructure. This makes it easier to integrate the services and applications with each other. Additionally, this allows developers to more easily leverage some of the services and applications to offer improved capabilities for other services and applications.

B. Exemplary Embodiment

Figure 2:
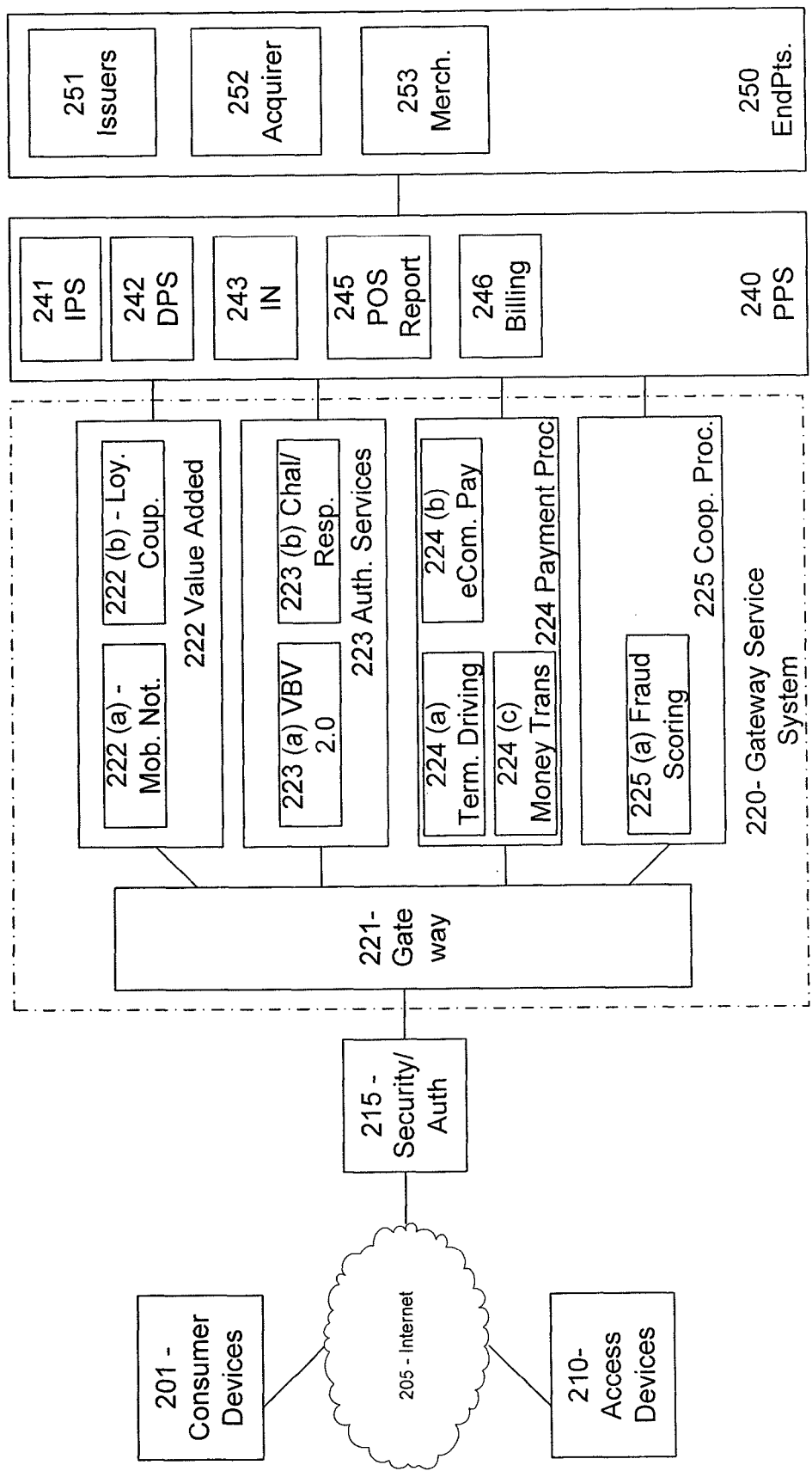
FIG. 2 illustrates an embodiment of the present invention.

FIG. 2 illustrates an embodiment of the present invention.

As described in more detail later in this disclosure, consumer devices 201 may be in any suitable form. For example, suitable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of consumer devices include cellular phones, personal digital assistants (PDAs), pagers, payment cards, security cards, access cards, smart media, transponders, and the like. The consumer devices can also be debit devices (e.g., a debit card), credit devices (e.g., a credit card), or stored value devices (e.g., a stored value card). Other consumer devices may include personal computers, laptops, or other devices capable of communicating over the internet.

As described in more detail later in this disclosure, access devices 210 can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

In the embodiment illustrated in FIG. 2, both the consumer devices 201 and access devices 210 are shown as being connected to the internet 205. In other embodiments of the invention, consumer devices 201 or access devices 210 may be connected to other networks. For example, in some embodiments these devices may be connected to a cellular network, satellite-based network, or any other suitable network for data communications. In some embodiments, consumer devices or access devices may connect to the internet via a second network, such as a cellular network.

In the embodiment illustrated in FIG. 2, a security/authorization module 215 sits between the internet 205 and a gateway service system 220. In some embodiments, the security/authorization module 215 may comprise items such as firewalls, load balancers, or any other programs running on a server computer that can be used to protect a gateway service system 220 from malicious attacks.

Gateway service system 220 is represented in FIG. 2 as comprising two distinct classes of systems: a gateway 221 and various service systems 222-225. The gateway service system 220 is further integrated with a legacy payment processing system 240. This integration allows the gateway service system 220 to offer services to consumer devices 201 and access devices 210 that may not normally be able to directly communicate with the payment processing system 240. In some embodiments, the payment processing system may not need to be modified in order to integrate with the gateway service system 220.

Gateway 221 primarily serves as a mechanism for forwarding communication from consumer devices 201 or access devices 210 to the appropriate service system for the communication. Typically the gateway 221 will comprise one or more server computers running software. According to various embodiments, a gateway 221 may accomplish its task in any number of ways. For example, packets of data that are received from consumer devices 201 or access devices 210 may contain information indicating the proper destination of the packet. In some embodiments, various consumer devices 201 or access devices 210 may only be authorized to communicate with particular service systems. One skilled in the art will recognize that there are many other ways to properly route communications from consumer devices 201 and access devices 210 to the appropriate service system. In some embodiments, multiple gateways may exist wherein each gateway handles communications received from a different network. For example, one gateway may handle communications received over the internet while another gateway may handle communication received over a telecommunication network.

Service systems, such as value added service system 222, authentication services 223, payment processing services 224, and cooperative processing services 225, sit behind the gateway 221, and these service systems comprise server computers running modules that contain the logic for the various services and applications that provide their functionality in conjunction with a payment processing system. As illustrated in FIG. 2, each of these service systems may be further comprised of additional subsystems. For example, valued added service 222 is shown in FIG. 2 with subsystems 222(a) for a mobile notification service and 222(b) for a loyalty coupon service. Authentication service 223 is shown with a Verified by Visa 2.0 service 223(a) and a challenge/response service 223(b). Payment processing services 224 is shown with a terminal driving service 224(a), eCommerce payment service 224(b), and a money transfer service 224(c). Cooperative processing service 225 is shown with a fraud scoring service 225(a). Other embodiments may contain service systems other than the ones represented in FIG. 2, and many of these services, systems, and subsystems are described in more detail later in this disclosure. Additionally, some embodiments may have additional systems that serve to support the service systems. For example, a database server could interface with multiple service systems to help those systems implement their functionality.

The payment processing system 240 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions.

Payment processing systems, such as VisaNet™, typically include various sub-systems that help the networks provide their services. For example, VisaNet™, includes an Integrated Payment System (IPS) 241, such as the Visa Integrated Payment System, which processes authorization requests and a Base II system which performs clearing and settlement services. Other potential modules include:

An authorization interface for high volume retail transactions, such as Visa Direct Exchange (DEX). These authorization interfaces facilitate high-speed processing of payment authorizations from devices such as credit cards;

Back Office Connectivity (B/O) that can provide functionality such as security monitoring and real time help desk technical support to merchants;

Debit Processing Service (DPS) 242 to provide comprehensive processing support for check cards, credit cards, prepaid cards, Interlink®, Visa/PLUS® ATM Network, POS Check Services, and various ePay applications. Additionally, a debit processing service can provide full-functioning ATM terminal driving and network gateways services;

An incentive network 243, such as the Visa Incentive Network, to provide a full-service direct marketing program developed to help merchants easily deliver relevant offers and coupons to a targeted group of cardholders; and Other modules may also be a part of a payment processing system, such as point-of-sale reporting systems 245, billing reporting systems 246, and other systems.

Payment processing system 240 is described in more detail later in this disclosure.

Connected to the payment processing system are various endpoints 250 in the payment processing system such as issuers 251, acquirers 252, and merchants 253. These endpoints are the traditional endpoints of a payment processing system, and each of these endpoints is discussed in more detail later in this disclosure.

C. Gateway Service Clouds

Figure 3:
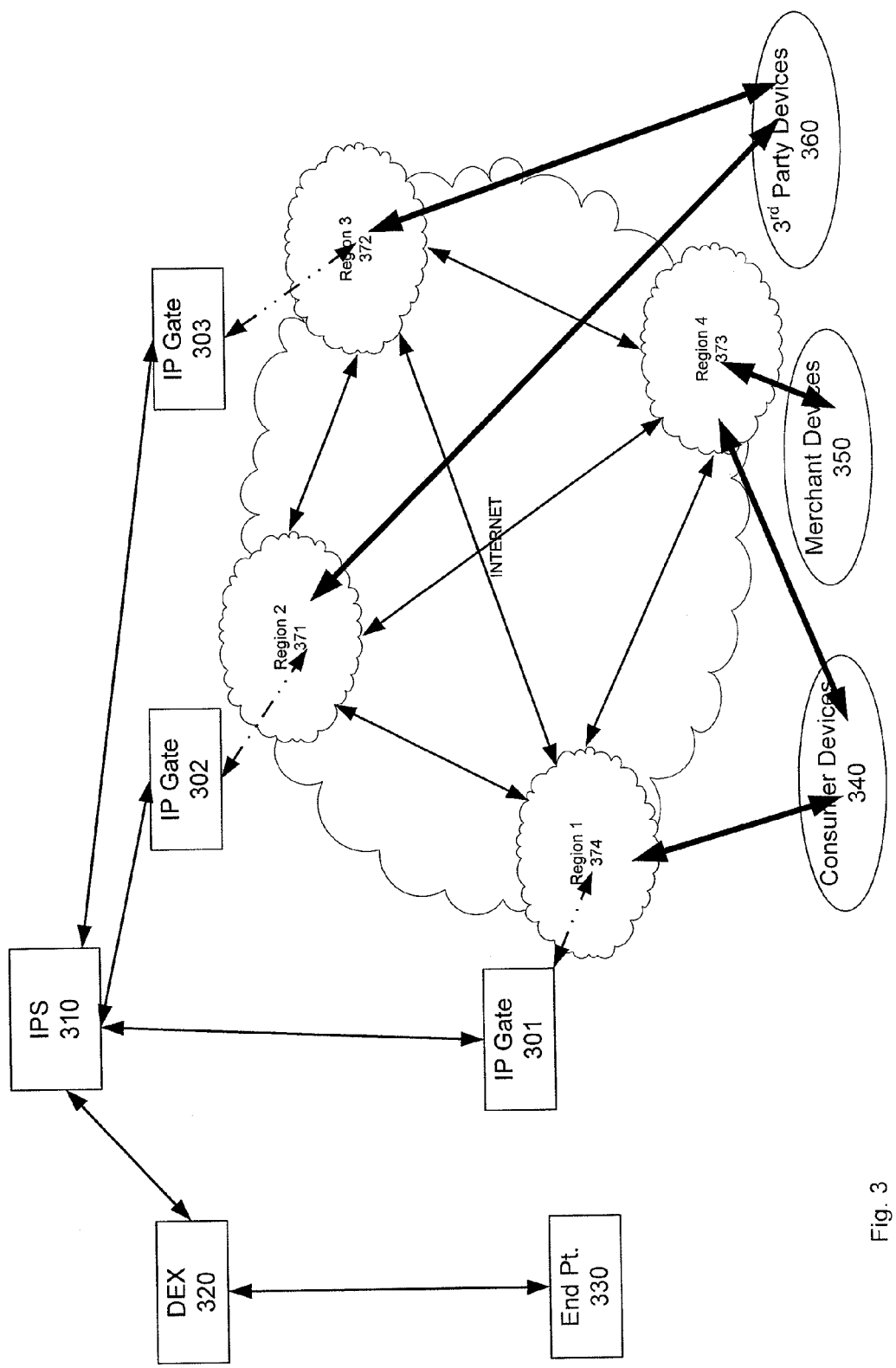
FIG. 3 illustrates an embodiment of the present invention.

According to another embodiment of the invention, there is not just one instance of a gateway service system, but there are many related gateway service systems that can each be used to offer access to a payment processing system. Such an embodiment is illustrated in FIG. 3. This embodiment offers a redundant solution that can be delivered centrally or locally throughout the world as market conditions dictate. These various gateway service systems may form "gateway service clouds" that offer broad access to a payment processing system. Devices can access any of available gateway service systems, but devices will typically access the gateway service system that will provide the best service for the device. For instance, a device will often use the gateway that is the closest to the device. Closest may be in either a network sense or physical sense. If device's first choice for a gateway is non-responsive, the device can try to access more remote gateways.

In FIG. 3, there are three gateway service systems, system 301, system 302, and system 303. These three gateway service systems each provide access to various payment processing system modules. In FIG. 3, two payment processing system modules are represented. There is an integrated payment system (IPS) 310 and a Direct Exchange (DEX) 320 interface. These payment processing modules are connected to various network endpoints 330. As mentioned previously, such endpoints may include issuers, acquirers, and merchants.

There are four regions represented in FIG. 3, regions 371-374. In other embodiments there may be additional regions or fewer regions. The regions may represent any logical division of an area that wishes to use the gateway service systems to connect to the payment processing system. For example, the regions may present different geographical regions, such as North America, Latin America, Europe, Asia, etc. Alternatively, the regions may be divided by various network characteristics, such as IP address.

Within regions 371-374 are various consumer devices 340, merchant devices 350, such as access devices, and perhaps other third party devices 360 that wish to use a gateway service system to connect to a payment processing system. Any of these devices can use any of the three represented gateway service systems 301-303 to access the payment processing system. Once a gateway service system has been selected by a device, then the device can interact with a payment processing system in the same manner as it would if there was only one gateway service system available.

It should be understood that while this disclosure frequently references only a single gateway service system when describing the features and functionality of the system, these descriptions are also applicable to embodiments that utilize gateway service clouds.

D. Exemplary Embodiments Enabling Various Services and Applications

Payment processing systems (sometimes referred to as payment processing networks) offer a variety of services and applications to users. For example, one of the primary services offered by payment processing systems is a service that authorizes payment transactions. In addition to processing payment transactions, payment processing systems also typically have many other services provided to users of the system. Example services include applications such as: authentication applications, ATM locator applications, offers/couponing applications, activity alert applications, and balance notifications application.

Example services that can be used with various embodiments of the present invention have been previously described in a variety of currently pending patent applications. Those patent applications include: U.S. patent application Ser. No. 11/962836 describing a customized payment transaction notification application, U.S. patent application Ser. No. 11/963736 describing a real-time balance update application, U.S. patent application Ser. No. 11/960162 describing a coupon application, U.S. patent application Ser. No. 11/960173 describing a mobile coupon application, U.S. patent application Ser. No. 11/536296 describing a mobile transit fare payment application, U.S. patent application Ser. No. 12/022060 describing a mobile device payment application, and U.S. patent application Ser. No. 11/794343 describing a challenge response application. All of these patent applications are herein incorporated by reference in their entirety for all purposes. One skilled in the art will recognize that there are many other potential services that can be integrated with a payment processing system in a manner similar to these disclosed references. Additionally, any of these services or any features thereof can be combined in any suitable manner.

FIGS. 4-17 illustrate how data might flow between consumers, merchants, and other users of a payment processing system according to various services and applications that can be offered according to various embodiments. The embodiments illustrated in FIGS. 4-17 share many common components. Some of these components are described below.

Consumers 501 (sometimes referred to as "users" in this disclosure) are one set of end users of a gateway service platform 520. The consumers 501 can communicate with the gateway service platform 520 directly over the internet 510 or indirectly via a telecommunication network 502. Typically, consumers 501 will use a portable consumer device or other electronic communication means to communicate with the gateway service platform 520. Similarly, a merchant 503 is another end user that may communicate with a gateway service platform 520 over the internet 510 or a telecommunication network 502. A merchant 503 may use an access device or other appropriate means to communicate with the gateway service platform 520.

The gateway service platform 520 illustrated in FIGS. 4-17 is shown with three separate tiers of subsystems: a gateway tier 521, an application tier 522, and a database tier 523.

Gateway tier 521 is similar to gateway 321 as discussed with reference to FIG. 2. The embodiment of gateway tier 521 illustrated in FIGS. 4-17 is shown with two distinct gateways. There is a web gateway 521(b) which serves as a gateway for web-based communications received by the gateway service platform 520, and there is a telecommunications gateway 521(a) that can serve as a gateway for communications received over a telecommunication network. Other embodiments may also contain other gateways to provide the gateway service platform with access to other open networks.

Application tier 522 is shown in FIGS. 4-17 with an application server 522(a) and a reporting server 522(b). Application tier 522, as represented in FIGS. 4-17, is one representation of a service system represented in FIG. 2. An application server 522(a) may comprise a server computer running software comprising the logic for a particular service or application. Reporting server 522(b) can be used to generate reports, conduct analysis, or offer any other type of ancillary service associated with the application server's service. Because FIGS. 4-17 each illustrate the dataflow for an embodiment of one particular service or application, only one application tier 522 with one application server 522(a) and one reporting server 522(b) is shown in FIGS. 4-17. However, as previously disclosed, a gateway service platform 520 will typically offer many different services and applications. These services and applications may all be offered from a single application tier 522 using many different servers, or there may be multiple application tiers within an embodiment of a gateway service platform 520. Furthermore, many of these services and applications will be integrated with each other to provide new functionality. Many of these services and applications will often have integration points between them that may not be represented in FIGS. 4-17.

Database tier 523 can be used within gateway service platform 520 to store various pieces of information that are used to provide the services, applications, and other reporting capabilities of the application tier 522. According to various embodiments, the database tier can be used to store information for a plurality of different services and applications, and integrated services and applications may access the same data structures stored in the database tier. In FIGS. 4-17, the database tier is shown with a SQL server computer 523(*a*) and an associated data store 523(*b*). One skilled in the art will recognize that other types of databases or similar means for storing data can be used in place of an SQL server computer.

Payment processing system 530, and the associated subcomponents of the network 531-537, are the same as payment processing system 340 shown in FIG. 2. For example, 531 is a payment system, such as the Visa Integrated Payments system, 532 is a debit processing service, 533 is an incentives network, such as the Visa Incentives Network, 536 is a point-of-sale reporting module, and 537 is a billing module.

Additionally, FIGS. 4-17 show various endpoints as appropriate for the particular service or application being represented in the figure. For example, FIG. 7 illustrates an issuer payor 550 and an issuer payee 540 transferring money between the payer and the beneficiary. These illustrated endpoints are the typical endpoints for a payment processing system 530. These endpoints will be described in more detail where appropriate in the context of the particular service or application being discussed.

It should be noted that while the following descriptions of various services and applications can be used to implement the described functionality, one skilled in the art will recognize that similar services and functionality can be implemented using different data flows and modules. The below descriptions are meant to be examples of how one skilled in the art could implement a wide variety of services of applications using the gateway service platform.

1. Challenge/Response Authentication Service

Figure 4:
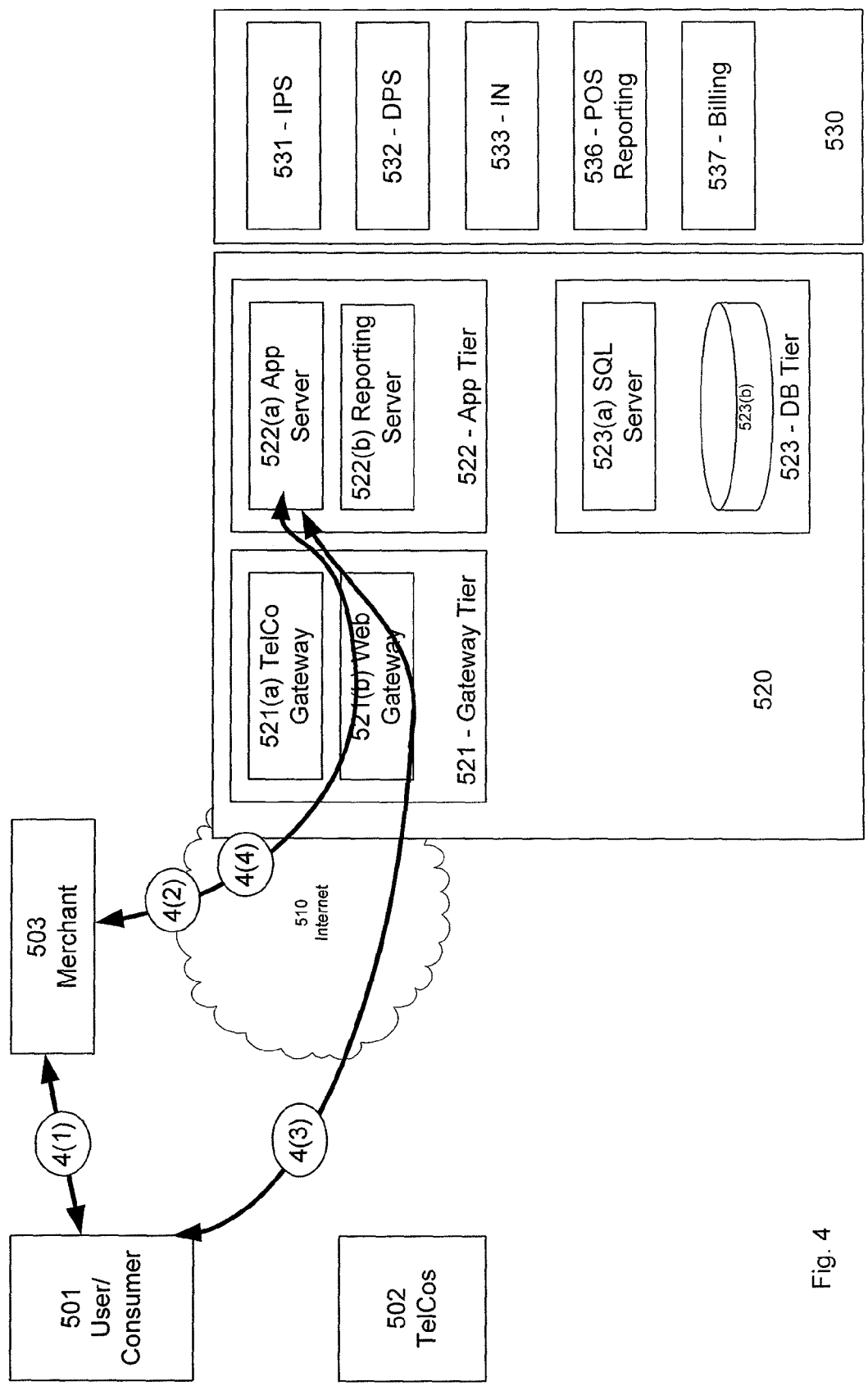
FIG. 4 illustrates the dataflow for a challenge-response service according to one embodiment.

FIG. 4 illustrates the dataflow for a challenge-response service according to one embodiment. U.S. patent application Ser. No. 11/794,343 also describes a challenge response service and can be referenced for additional information on such services.

Challenge/response services and applications are services that enable new authentication solutions to be delivered for high-risk transactions. For example, card-not-present (CNP) transactions, such as transactions conducted with a merchant over the internet, is one situation where a challenge/response service can be used to help prevent fraud.

Challenge/response services can go beyond simple username/password mechanisms. Usernames and passwords can be very burdensome for consumers because consumers frequently have multiple passwords for different channels and products and have to potentially memorize many different passwords. Additionally, consumers may be required to change passwords over time for different services. Additionally, there can be different levels of ownership over a single account used to conduct a transaction (e.g., joint payment cards).

As a result of the potential difficulties encountered with username/password challenge-response services, many different types of challenge-response systems have been developed. Many of these systems do not require enrollment before the challenge-response service can be used, and the degree of difficultly or the number of successful responses before a transaction is allowed can be adjusted based on the risk of a particular transaction. One example of a challenge-response system is to require a consumer to enter the zip code associated with billing address of portable consumer device. Other personal information on record could also be used instead of the billing zip code. Another example is that a user could be asked to respond with information specifically entered by the consumer at an earlier time (e.g., the model of the consumer's first car, consumer's high school, etc.).

Another design consideration when implementing a challenge-response service includes avoiding complex transaction design and post integration to payment systems. For example, a complex design of a challenge-response service for a transaction occurring over the web would make it more difficult for the service to be implemented for each web retailer wishing to take advantage of the challenge response service.

In FIG. 4, an example challenge-response service implemented using the gateway service platform is illustrated.

At step 4(1), a consumer 501 checks out with a merchant 503. In one embodiment, the merchant 503 is an online merchant. The consumer 501 checks out by indicating that the consumer 501 is ready to purchase one or more items that have been placed in a shopping basket on the merchant's 503 website.

At step 4(2), the merchant 503 sends the information contained in the consumer's shopping basket to the application server 522(*a*) located in the gateway service platform 520. In the embodiment illustrated in FIG. 4, this information first passes through the web gateway 521 (*b*) before arriving at the application server 522(*a*). The web gateway 521 (*b*) may analyze the information arriving from the merchant 503 to ensure that the communication arrives at an application server that offers a challenge-response service.

At step 4(3) a challenge is presented directly to the consumer 501. The challenge can be generated based on information received from the merchant 503. For example, the consumer 501 would have already entered the account information for the payment device to be used to conduct the transaction. This information can be used to select the appropriate challenge to be presented to the consumer 501. In one embodiment, the information used to create the challenge may be present within the application tier 522 or the database tier 523. In other embodiments, the application server 522(*a*) may request information from the payment processing system 530 in order to create the challenge. Additionally, other information, such as the value of the items to be purchased, the time of day of the transaction, or any other relevant information can be used to select the challenge presented to the consumer 501. The consumer 501 then enters the response to the challenge, and the application tier 522 then determines whether the response was correct.

At step 4(4), outcome of the challenge-response service is communicated to the merchant 503. If the consumer 501 successfully passed the challenge presented, the merchant 503 can process the transaction with the knowledge that the consumer 501 has successfully complete the challenge-response service offered by the gateway service platform 520.

2. Payment-to-Peer Service

Figure 5:
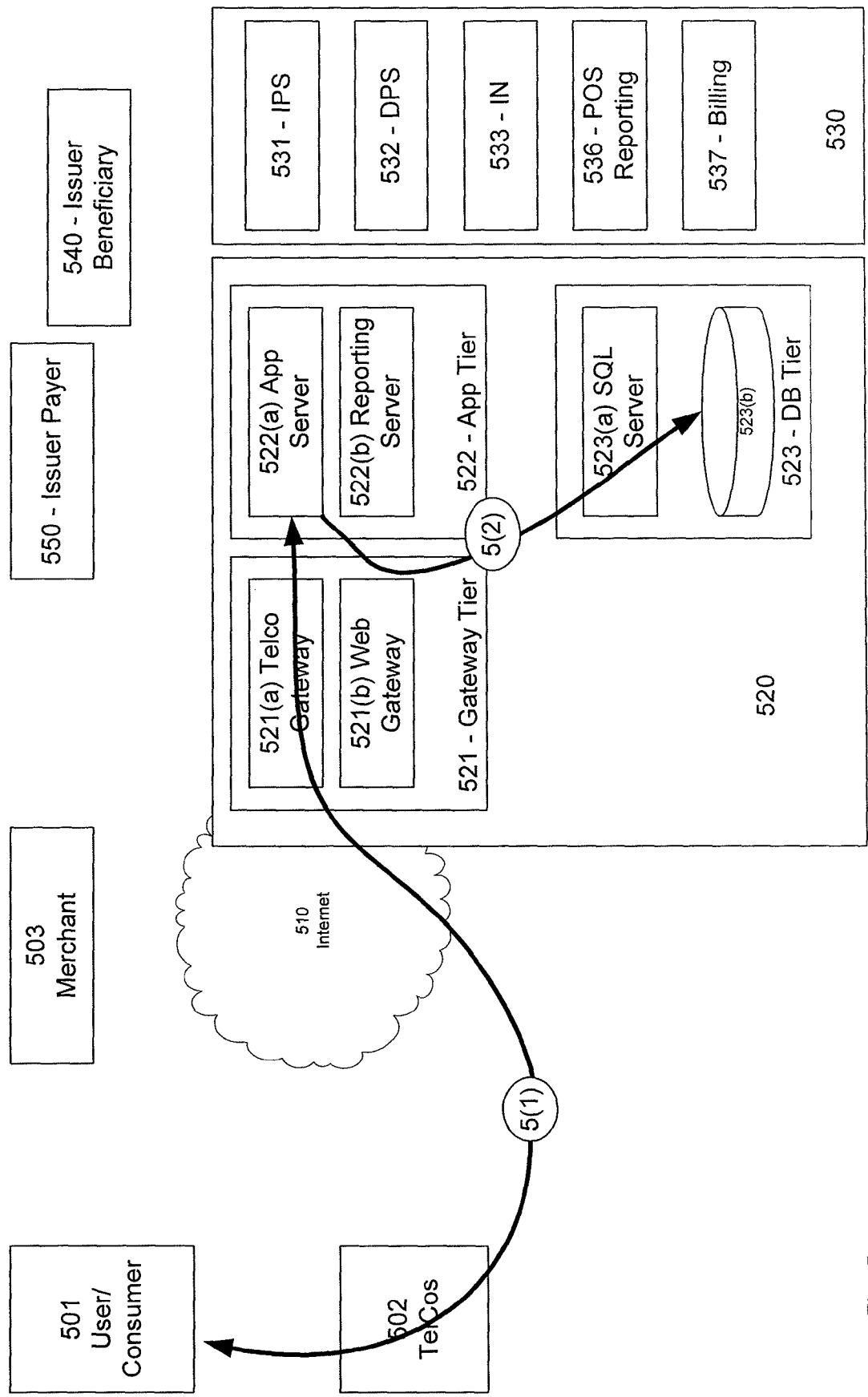
FIG. 5 illustrates a request for a P2P payment to be made according to one embodiment.
Figure 6:
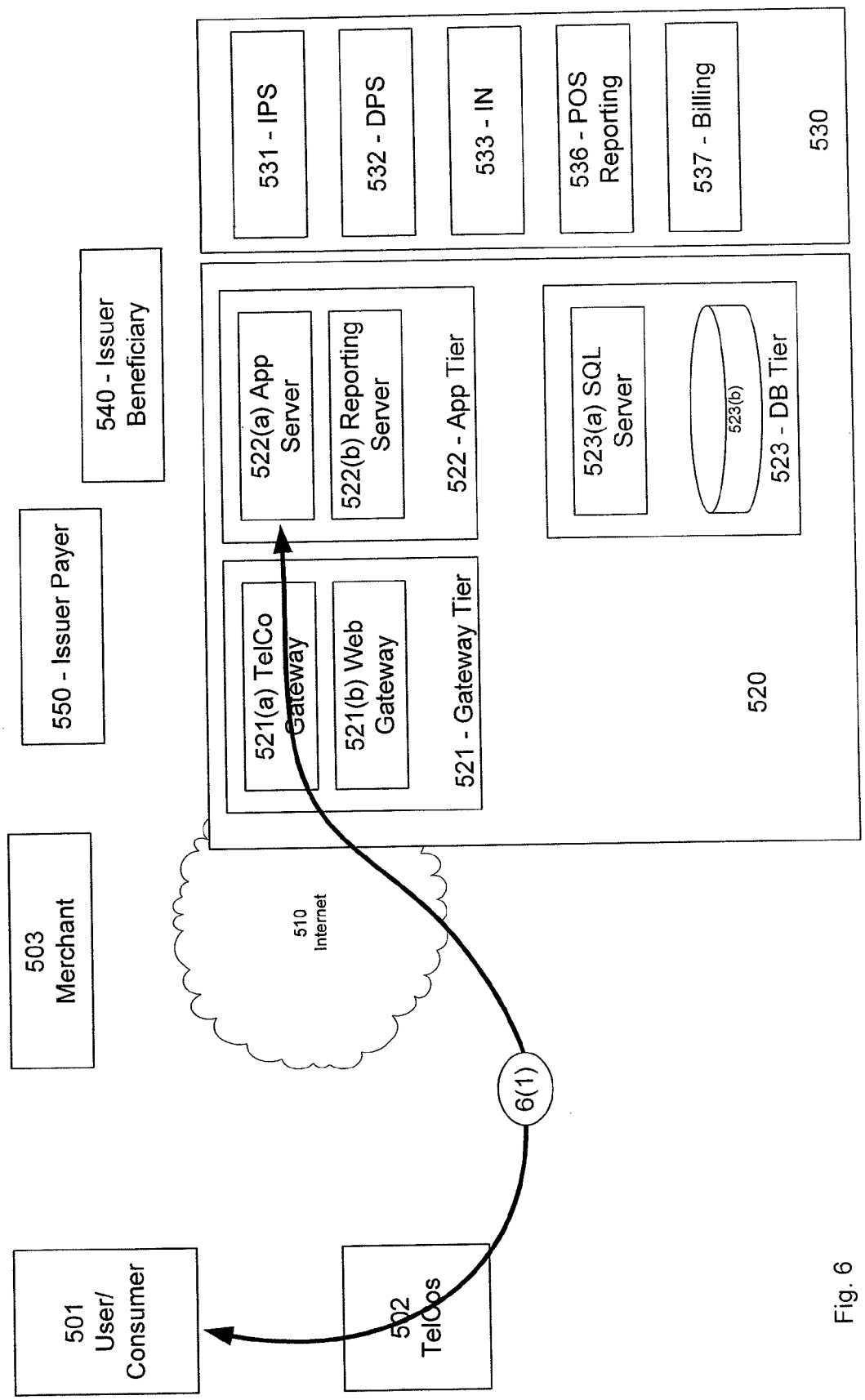
FIG. 6 illustrates the validation of a P2P request according to one embodiment.
Figure 7:
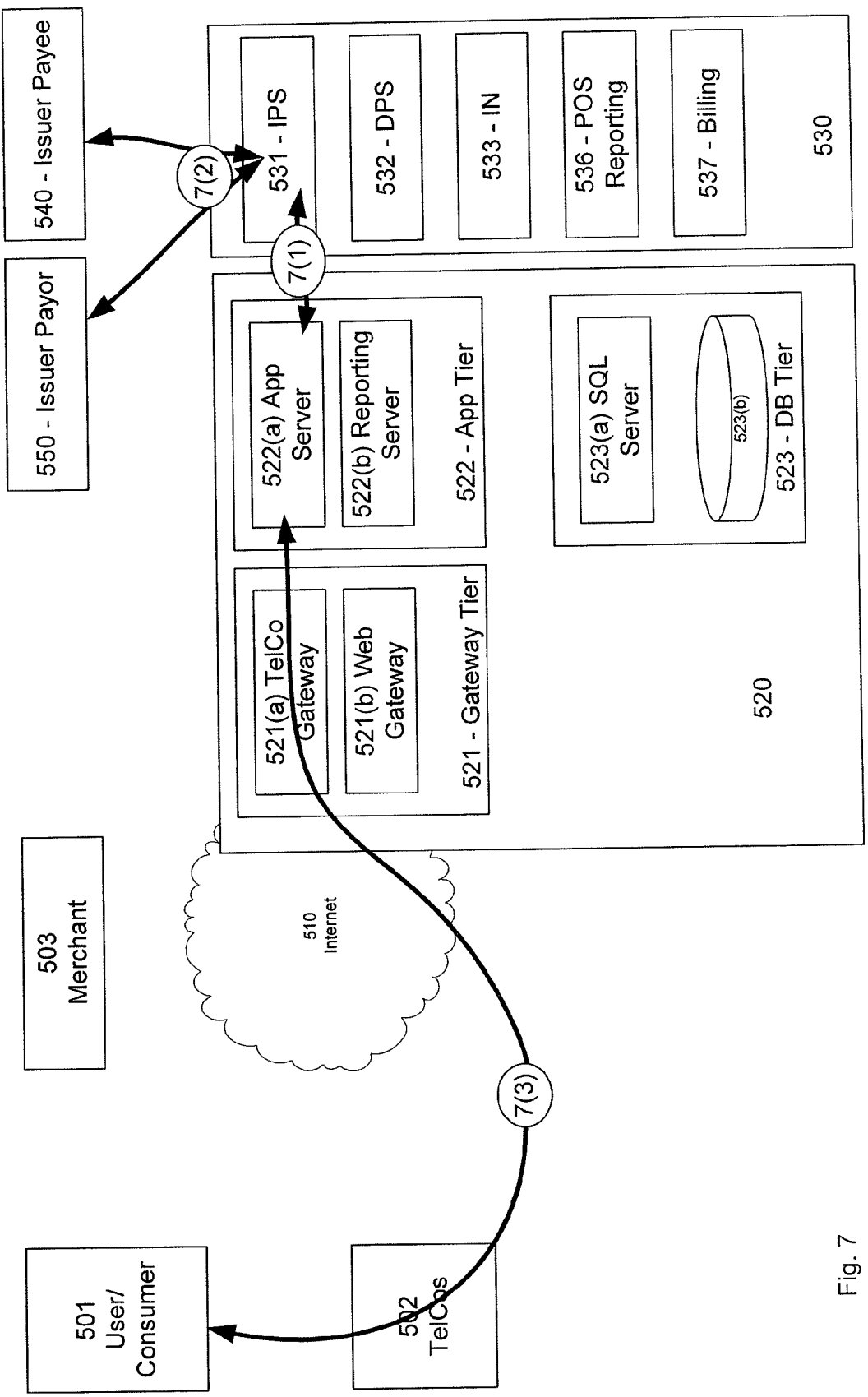
FIG. 7 illustrates the processing of a P2P request according to one embodiment.

FIGS. 5-7 illustrate the dataflow for a payment-to-peer (P2P) service according to one embodiment. A payment-to-business service would follow a similar dataflow. FIG. 5 illustrates a request for a P2P payment to be made according to one embodiment. FIG. 6 illustrates the validation of a P2P request according to one embodiment. FIG. 7 illustrates the processing of a P2P request according to one embodiment.

In the context of a P2P service, a consumer (the "payor") may wish to send money to another user ("payee"), and the payee may wish to receive the money in the form of a deposit to an account that has been provided by an account issuer. As used herein, a "deposit" may include an actual transfer of money to an account such as a debit card account, or may include a debit to an account such as a credit card account.

There are many different types of accounts that can be issued, such as credit card accounts, debit card accounts, pre-paid card accounts, and gift card accounts. Generically, these accounts may be referred to as transaction accounts, because they will typically provide the payee with the ability to use the account to engage in financial transactions. This is generally accomplished through the issuance of a transaction card that is associated with the transaction account. Transaction cards can take many forms, including plastic cards with a magnetic stripe, smartcards, secure tokens, or any other suitable form. In other situations, the payee may only have an account number which identifies the transaction account and can be used to perform transactions.

The payee may often have multiple transaction accounts that have been issued by multiple issuers. As discussed herein, an issuer is often a financial institution, such as a bank, that creates and maintains financial accounts. Unlike traditional bank accounts, such as checking and savings accounts, it is typically not possible for anyone other than the owner or authorized user of a transaction account to make deposits into the transaction account. As an example, it is typically not possible for anyone other than the owner or authorized user of a credit card to make payments to the account associated with the credit card. This may be for the simple reason that to allow a third party to make a payment to a credit card would require revealing the account information, such as the credit card number, to the third party.

There are many variations on the P2P service illustrated in FIGS. 5-7. For example, some embodiments may allow payees to send invoices detailing why a payment is requested from a payor. Other embodiments may allow for users to send or receive payments without registering with the P2P service ("ad hoc" users). One skilled in the art will recognize that many other potential variations of a P2P service can be implement using a gateway service platform 520.

In FIG. 5 at step 5(1), a user 501 makes a P2P payment request to the gateway service platform 520. In the example illustrated in FIG. 5, the user 501 makes the request using a telecommunication network 502 that provides access to the internet 510. For example, the user 501 may make the P2P payment request by sending a text message from a portable consumer device such as a mobile phone. The telecommunication network 502 routes this text message to the gateway service platform 520, wherein the Telco Gateway 521(*a*) routes the message to the appropriate application server 522 (*a*). Other embodiments of a P2P service implemented with a gateway service platform 520 may allow users to send a P2P payment request using a web-based interface, email, or any other appropriate means.

At step 5(2), the received payment request is validated and augmented by accessing data that may be stored within the database tier 523. For example, if the request was send by text message and indicated a particular user account to be used for the transaction, the P2P service could verify that the portable consumer device that sent the request is authorized to send P2P payment requests. Additionally, other information that might be needed to complete the request, such as the issuers of the financial accounts to be accessed during the transaction, can also be verified at this time. Various embodiments may also check the payment request against various preferences or limits set by the payor and stored by the P2P service. For example, the payor may have set a payment limit for P2P requests.

Referring now to FIG. 6 at step 6(1), if a payment request is made by text message, payor may receive an Interactive Voice Response (IVR) call back to validate the transaction. For example, the IVR callback may request a mobile pin to be entered before continuing with the transaction. This callback provides extra security for users who wish to initiate a payment to an individual or business from a device such as a mobile phone. Additionally, it may be possible to request additional information from the payor at this time.

Referring now to FIG. 7 at step 7(1), the payment request, after a successful IVR call back, is handed to IPS 531 in a payment processing system 530 for processing. The payment processing system 530 may then receive, as a part of the payment request, the account information provided by the payor. The payment processing system also needs to determine the issuer of the account to be used to make the payment. In one embodiment, the issuer can be determined based on the account number.

At step 7(2), IPS 531 orchestrates the payment between the proper financial institutions. The issuer 550 of the payor's transaction account may receive a request for the transfer of funds. Typically this request will contain account information and transaction information. After verifying that the account information is valid and that sufficient funds or credit exists to make the payment, the payor issuer 550 may respond to the payment processing system 530 and indicate that the transaction may proceed.

Upon receipt of the message indicting that the transaction may proceed, the payment processing system 530 may withdraw funds from the payor's account held with issuer 550. In one embodiment, the received funds may be temporarily stored in a generic holding account at the payment processing system 550 prior to being transferred to the issuer of the payee's account 540. In another embodiment, the funds may be temporarily stored in a holding account that is associated with the issuer 540 of the payee's account, but not specifically associated with the payee's account.

The payment processing system 530 may then push the funds received from the payor's transaction account into the account specified by the payee in a payment request. The payment processing system 530 may send a message to the issuer 540 of the payee's account requesting that the funds received be transferred from the account in which they are being held temporarily, into the account that the payee has specified. Again, the payment processing system 530 is capable of this transaction because it contains payment authorization, clearing, and settlement services. After the funds have been deposited into the account specified by the payee, the payee issuer 540 may send a response message to the payment processing system 530 indicating the successful transaction.

At step 7(3), the payor and payee may be notified of the completion of the transaction. This notification may alert the parties that the funds have been deposited into the specified account, and that the transaction is complete. In one embodiment, the notification may be in the form of an e-mail. In other embodiments, the notification may be an instant message, a telephone message, a pager message, or the like. Furthermore, in some embodiments, after the transaction is complete, all records of the transaction may be purged from the system in order to provide an additional measure of security and privacy to both the payor and the payee.

Although the above example depicts a single issuer associated with a single payee with a single account, it would be clear to a person of skill in the art that this is not limiting. A payee may have any number of accounts, issued by any number of issuers. Likewise, a payor may have any number of accounts, issued by any number of issuers. Issuers may likewise issue transaction accounts to any number of users. In some embodiments, the payor and payee may both have transaction accounts issued by the same issuer.

4. Campaign Push Service for Offers or Coupons

Figure 8:
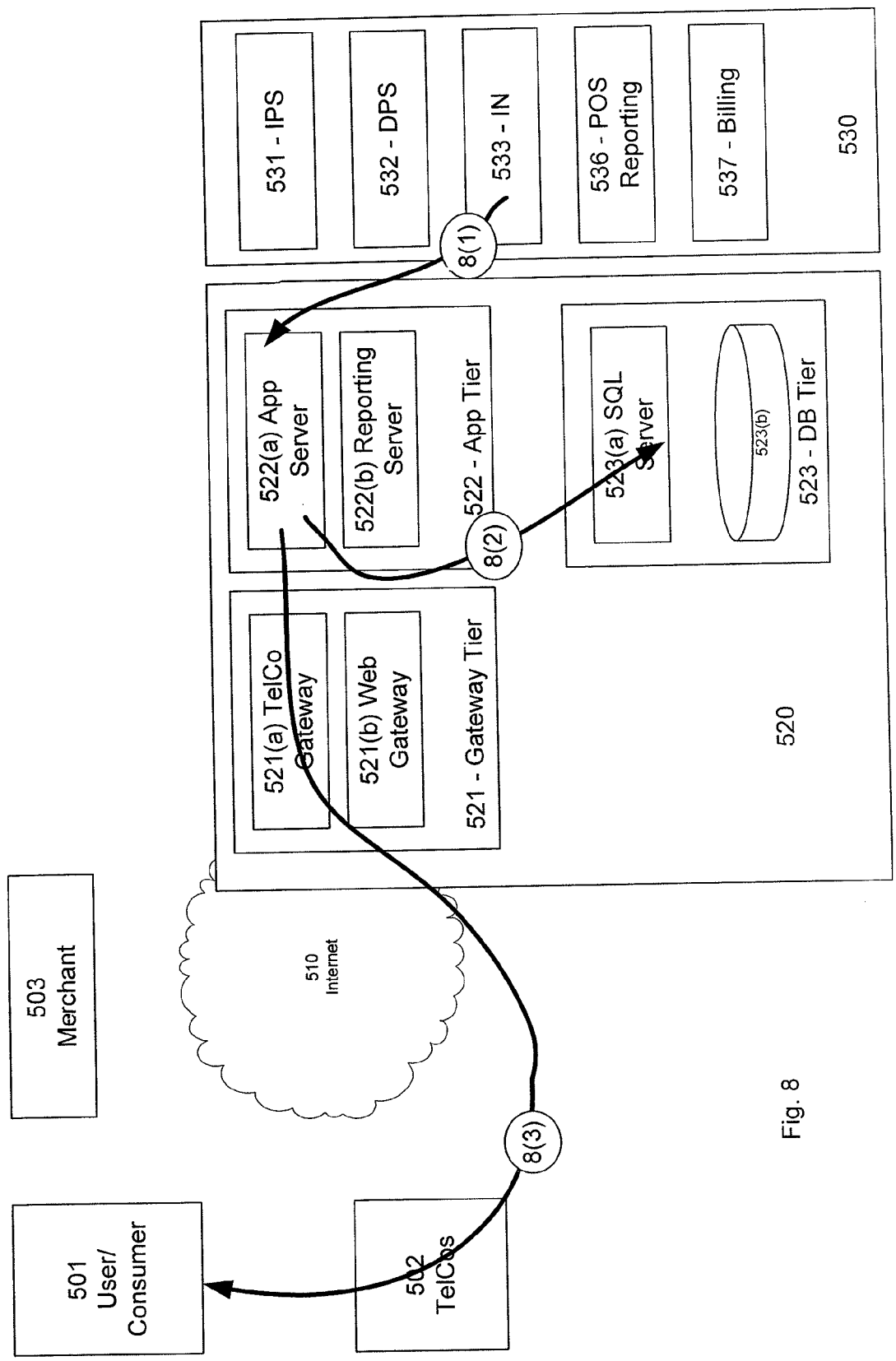
FIG. 8 illustrates the dataflow for a campaign push service according to one embodiment.

FIG. 8 illustrates the dataflow for a campaign push service according to one embodiment. U.S. patent applications Ser. No. 11/960,162, describing a coupon application and Ser. No. 11/960,173, describing a mobile coupon application, can also be referenced for additional information on campaign push services.

A campaign push service stores and optionally sends reward and promotional offers to consumers. Offers or coupons may be sent in any one of a number of different forms, including but not limited to a short messaging service (SMS) message, a SMS link, a multimedia messaging service (MMS) message, or e-mail message. Alternatively, the coupons could be distributed utilizing a Near Field Communications (NFC) system. Such an embodiment would require the portable consumer device to be equipped with an NFC chip and programmed with a software application. The source of the near field signal providing the electronic coupon could be local kiosks, for example as present in a shopping mall. An alternative source of electronic coupons available utilizing such near field communication is the point of sale itself. Consumers can also request to view promotional material stored within the system. Other sources are possible.

Typically, potential users enroll in the mobile coupon program using an enrollment webpage or other similar mechanism. At this time, relevant information is collected from the user. For example, in an enrollment form supplied electronically a user, the prospective participant can provide information such as the telephone number of their portable device, a security password, and preferences regarding the types of mobile coupons that they wish to receive.

Participants in the program may be notified of particular events, for example limited time promotions. According to certain embodiments, the coupons can be targeted based upon a location based services (LBS) approach, utilizing prior purchasing activity by a consumer as detected over a payment processing system. For example, when the user swipes a card at a point-of-sale (POS), an authorization message is returned from the payment network which includes a Merchant Identification Number (MID). The user's location at that time of sale can be determined from the MID number.

Specifically, where a payment transaction is conducted over a payment processing system, certain information is communicated that can be used for targeting of a mobile coupon. In particular, the very existence of the prior purchase transaction reveals the consumer to be actively engaged in shopping rather than other activities (i.e. sleeping or working). Based upon this timing information, the consumer is known to likely be receptive to a mobile coupon for a subsequent transaction. Accordingly, embodiments of the present invention may thus generate and disseminate a mobile coupon to the consumer within a predetermined, limited time period from receiving an indication from the payment processing system that a prior payment transaction has occurred. Such an approach allows for dissemination of a timely, non-intrusive mobile coupons to the consumer.

The duration of effectiveness of such a mobile coupon can also be limited by time. Such an embodiment would provide an incentive for the recipient to monitor his or her portable device for receipt of a mobile coupon, and use that coupon within the limited period that it is effective. Moreover, in certain embodiments, upon expiration the mobile coupon could be configured to automatically disappear from the consumer's portable device. This would reduce intrusiveness of the mobile coupon, as the consumer is not obligated to delete a backlog of expired coupons from his or her portable device.

Mobile coupons can also be targeted based upon a geographic location of the user as determined from the payment processing system. For example, the location of a consumer can be determined by analyzing the location of the current base station through which the portable user device is transmitting and receiving information. The location of a consumer may also be determined by the use of Global Positioning System (GPS) technology.

Additionally, information regarding the nature of the prior purchase conducted over the payment processing system can be referenced to generate the coupon. Thus, a prior purchase of one product (for example a vacuum cleaner), could lead to generation of a second product (bags for the vacuum cleaner). This coupon generation could be irrespective of the time or physical location of a prior purchasing transaction. Still further alternatively, an LBS approach could be based upon the seller of the second product having an affinity agreement with the seller of the previous product purchased.

Moreover, a mobile coupon may be generated based upon more than one piece of information gleaned from a prior purchasing transaction conducted over a payment processing system. Specifically, the time, geographic location, and/or nature of the prior purchase transaction could be combined to generate the targeted coupon.

Coupons may also be generated based on the accrual of a certain volume of purchases utilizing a particular payment card not typically available to other participants in the mobile coupon program. This targeted electronic coupon is then communicated to the consumer's mobile device for redemption.

Many other potential campaigns are possible using the gateway service platform.

Referring to FIG. 8 at step 8(1), a campaign file is provided to the gateway service system 520. In FIG. 8, the incentive network 533 pushes this campaign file to the gateway service system, but the campaign file may also be received from another component of the payment processing system 520 or manually staged from another source, such an issuer. This campaign file contains the parameters and rules of the campaign, such as the any of the parameters or rules described above.

At step 8(2), the offers are stored within the database tier 523. This allows for later web access of the offers by users/consumers 501. When a consumer 501 later accesses a stored coupon, this is sometimes referred to as a campaign pull. The dataflow used for a campaign pull is discussed in more detail in relation to FIG. 9.

At step 8(3), offers that are to be sent are pushed out to their destination. In the embodiment illustrated in FIG. 8, the offer is pushed out through the telecommunication gateway 521 (a) over a telecommunication network 502. This data flow would be applicable to a dataflow pushed out using an SMS text message. Other embodiments that push offers using other means, such as e-mail, may use a slightly different data path. As discussed above, the offers can also be pushed out to nearby access devices, nearby ATM, etc.

According to some embodiments, an aggregator will secure sufficient bandwidth for all of the expected messages may also be used to help push out the offers to various consumers.

5. Campaign Pull Service for Offers or Coupons

Figure 9:
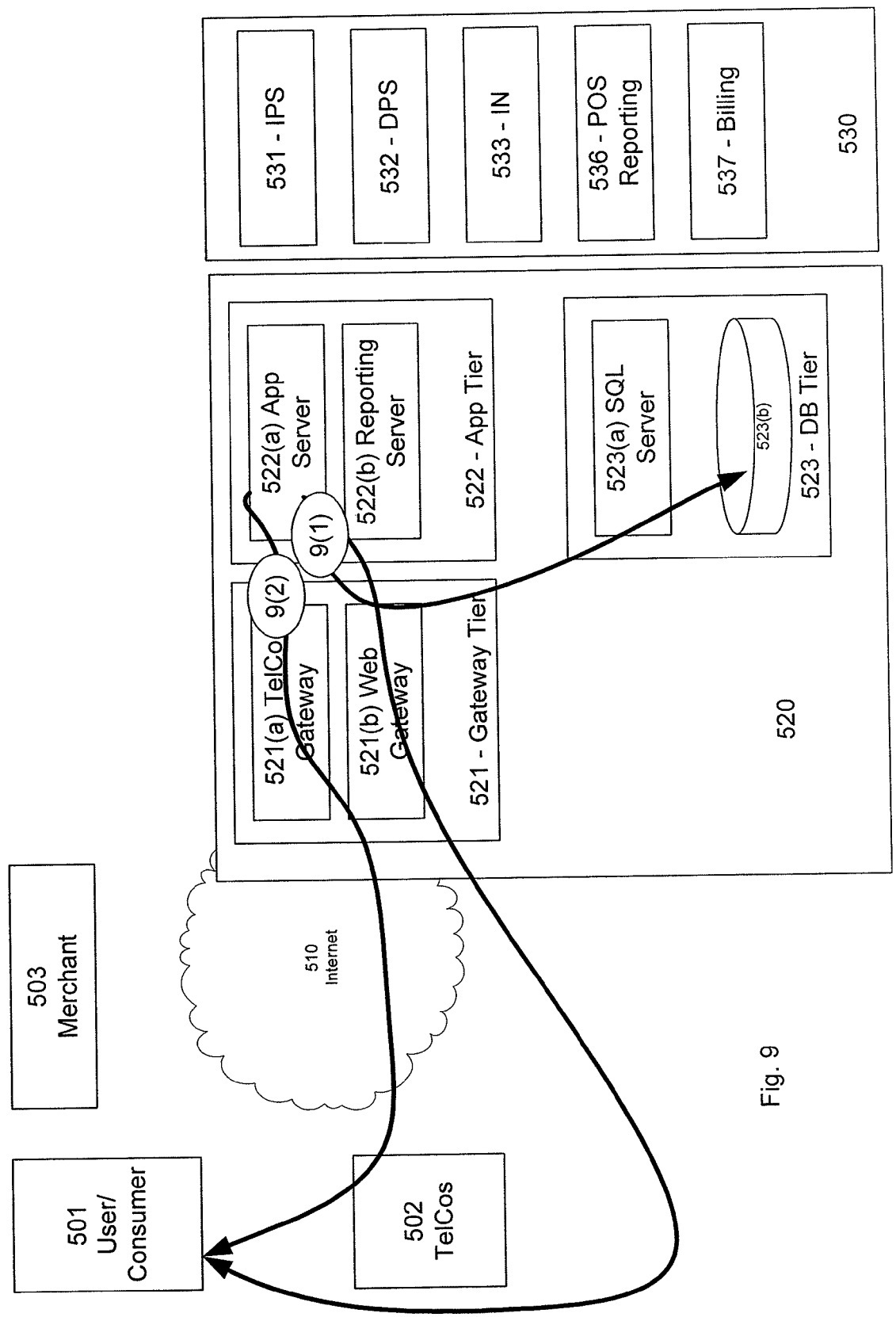
FIG. 9 illustrates the dataflow for a campaign pull service according to one embodiment.

FIG. 9 illustrates the dataflow for a campaign pull service according to one embodiment.

As previously discussed, a campaign pull service is closely linked with a campaign push service. After a coupon or other offer has been pushed to a consumer, the consumer may wish to store the offer for later use rather than immediately redeem the offer. A campaign pull service allows for users to view, select, redeem, delete, ask for an offer to be re-sent, or take other actions on stored offers.

At step 9(1) in FIG. 9, a consumer 501 can view stored offers over a web browser, mobile phone, or other appropriate device, and select an offer to be sent to their mobile phone. In one embodiment, the stored offers are stored in the database tier 523. The consumer request to take an action on a stored offer is received through the gateway tier 521 and routed to the application server 522(a). The application server 522(a) then retrieves the requested coupon from the database tier 523.

At step 9(2), a selected offer is pushed out to the user. In the example illustrated in FIG. 9, the offer is pushed out to the consumer 501 through the telecommunication gateway 521(a) and a telecommunication network 502 to a suitable portable consumer device in the consumer's possession. Just as with any other offer pushed out to a consumer 501, it is possible to push out offers to a wide variety of devices. After an offer is received by the consumer, 501, the consumer 501 can redeem the offer or take any other appropriate action.

6. Event Services

Figure 10:
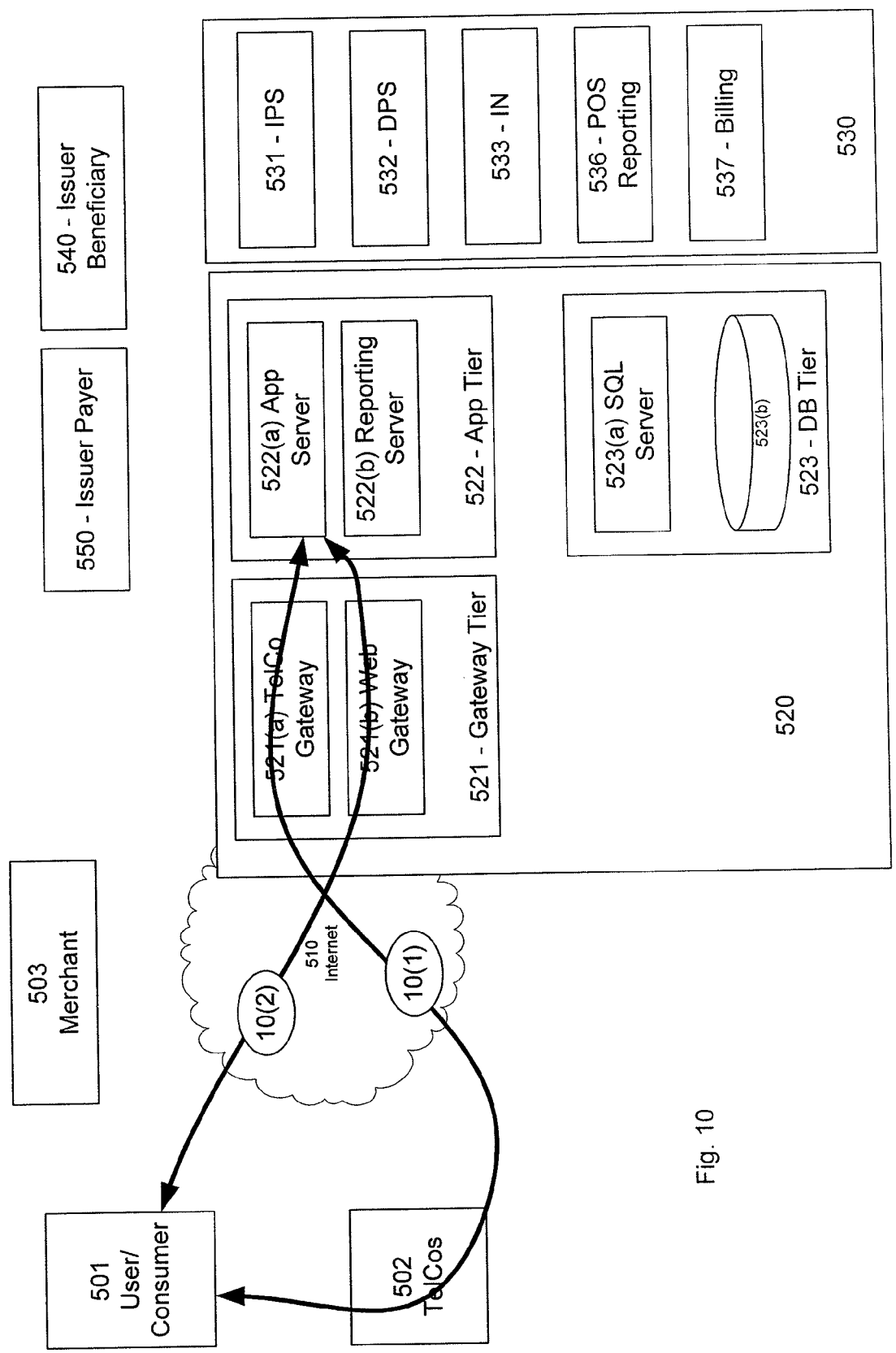
FIG. 10 illustrates the dataflow for a events service according to one embodiment.

FIG. 10 illustrates the dataflow for a events service according to one embodiment.

An events service provides many functions that may be useful to merchants 503 or other users hosting events for consumers 501. For example, attendees of an event can be asked to vote on a particular issue, polled for their opinion, solicited for donations, bid on items in an auction, or simply registered at an event.

FIG. 10 illustrates dataflows that may be used according to one embodiment to push out requests and receive responses for various events services. FIG. 10 also illustrates dataflows that may be used to receive registration requests from users/consumers 501 for events.

Dataflow 10(1) illustrates a pathway taken by text requests and text responses for events applications that push out requests to users/consumers 501 and then receive responses from the users/consumers 501. Requests that are sent via SMS text message start off at the application server 522(a), travel through the telecommunication gateway 521(a) to a telecommunication network 502. The telecommunication network 502 then delivers the request to users/consumers 501. When a user responds to a request, the response makes its way back to the application server 522(a) by retracing the steps of the original outbound message. Just as with the coupon/offer applications previously discussed, an events services request and response can also use other delivery mechanisms, such as e-mail, phone call, etc.

Dataflow 10(2) shows event registration services. This service can be used by consumers 501 to register or enroll in an event or service. In the example dataflow shown in FIG. 10, the consumer 501 uses a web application, such as a web browser, to send a registration request to the application server 522(a). Although not shown in FIG. 10, a successful request can then be stored somewhere within the database tier 523. When the consumer 501 arrives at the registered event, the consumer's registration can be confirmed by sending a request to the application server 522(a) to verify that the appropriate registration record exists in the database tier 523. Other variations of this basic model can also be implemented using the gateway service platform 520.

7. Card Alert Services

Figure 11:
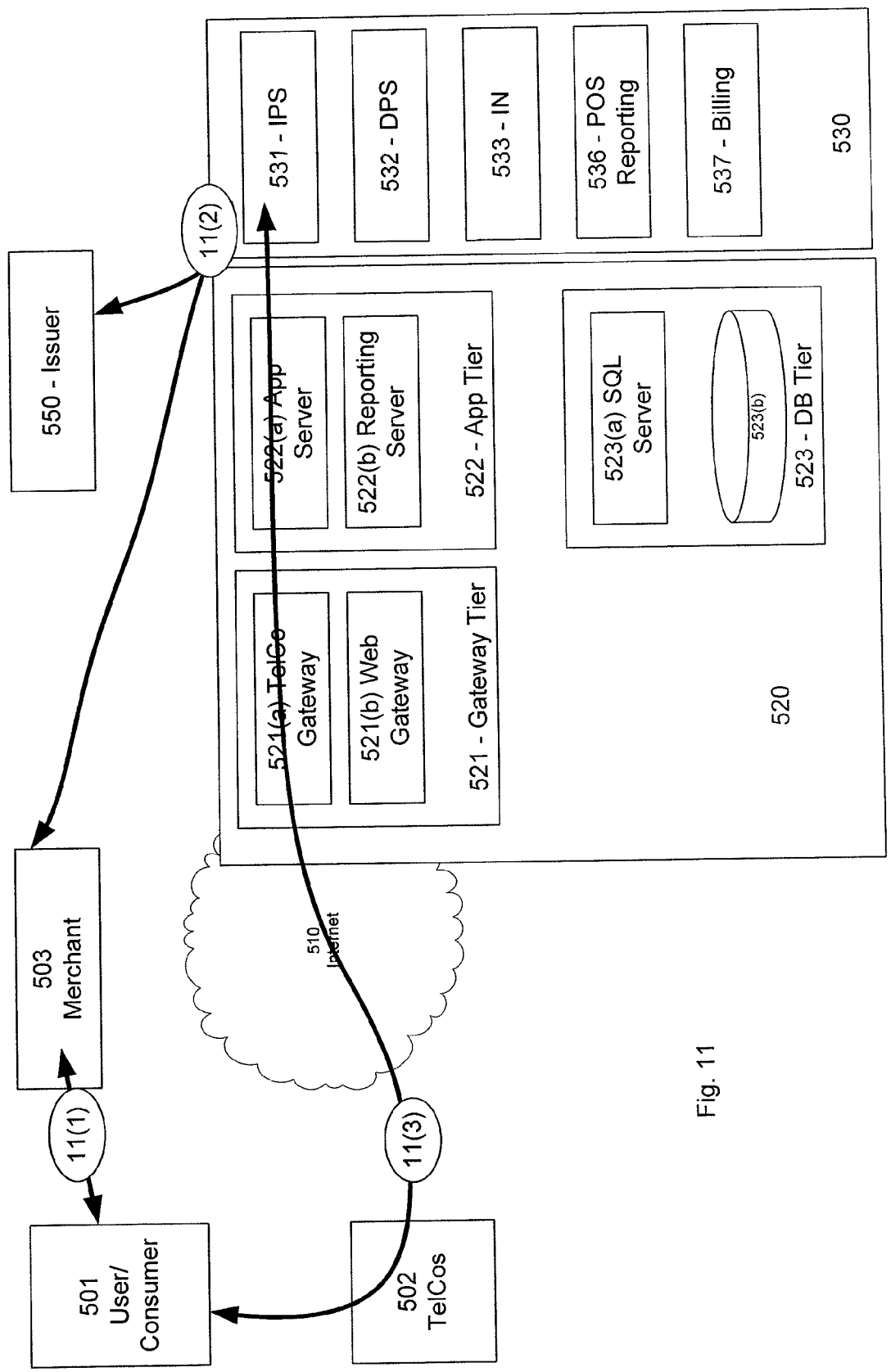
FIG. 11 illustrates the dataflow for a card alert service according to one embodiment.

FIG. 11 illustrates the dataflow for a card alert service according to one embodiment. U.S. patent application Ser. No. 11/962,836, describing a customized payment transaction notification application, can also be referenced for additional information on various card alert services.

A card alert can notify a cardholder of card activity. For example, alerts can be generated for purchases, ATM withdrawals, e-commerce transactions, foreign transaction, or other similar events.

A notification can be sent to any suitable device that can receive alerts and can provide such alerts to the consumer. Examples of notification devices include computers, cellular or mobile phones, wired telephones, personal digital assistants (PDAs), pagers, and the like. The notification device may be in any suitable form (e.g., suitable notification devices can be hand-held and compact so that they can fit into a consumer's wallet and/or pocket).

In some embodiments, the notification device and a portable consumer device can be embodied by the same device. For example, a wireless phone may function as both portable consumer device that can be used to pay for goods or services, and a notification device to notify the consumer if activity associated with the wireless phone, or an account number associated with the wireless phone, is being conducted.

If the notification device is a phone, it may comprise a processor, and a computer readable medium coupled to the processor. The computer readable medium comprises code for receiving an alert, wherein the alert indicates that the transaction is occurring, where the alert is sent to the consumer according to a time or communication mode previously specified by the consumer using an interface that allows the consumer to specify the time and communication mode for receiving the alert.

Before a consumer can receive alerts, the consumer can register with the alert system. Information can be received using an interface that allows the user to specify the time and communication mode for receiving an alert when a transaction is occurring with respect to a portable consumer device associated with the consumer. The information includes the communication mode or time in which the consumer wants to be notified.

In some embodiments, a consumer may customize the alert trigger (e.g., only notify the consumer if the transaction that is occurring is greater than $5000 in value), time of the alert (e.g., from 9 a.m. to 5 p.m.), communication mode (e.g., e-mail, telephone, SMS), and/or contact (e.g., wireless e-mail address, work e-mail address, spouse's cellular phone, home phone). The consumer may use an interface such as a Web interface to indicate how and/or when the consumer is to be alerted when the consumer's portable consumer device or account number associated with the portable consumer device is used. In embodiments of the invention, the consumer can specify whether he wants alerts set separately for each account number and/or portable consumer device that he has. He can also specify that any alerts that are provided by provided at the same time and under the same conditions across all accounts or portable consumer devices associated with the consumer.

Illustratively, the consumer can visit a web site that allows the consumer to customize the way in which he is alerted when his credit card is being used. Using a web interface such as a web page, the consumer may indicate that he wants to be notified by phone if his credit card or credit card account number is being used between 10 p.m. and 6 a.m. to conduct a transaction of any amount, since he will most likely be at home and sleeping during this time. Using the web page, the consumer may also specify that the consumer wants to be notified of any account or device activity via e-mail and a mobile phone during the hour of 6:00 a.m. and 10 p.m, only if the transaction amount if greater than $500. Thus, after the consumer provides this customization information, if a $5000 credit card transaction is conducted at 2 a.m. using the consumer's credit card, a payment processing organization and/or issuer may then provide an alert to the consumer by calling the consumer on the consumer's home telephone. The consumer may thereafter contact the payment processing organization and/or the issuer to take appropriate action. For example, the consumer may prevent the transaction from taking place by not authorizing the transaction. Alternatively, if a $5000 transaction is being conducted at 10 a.m. using the consumer's credit card or credit card account number, the payment processing organization and/or the issuer of the credit card may notify the consumer by providing an alert to his e-mail device and his mobile phone.

For simplicity of illustration, one portable consumer device, one consumer, one issuer, one notification device, one client computer, one aggregator, etc. is shown. It is understood however, that embodiments of the invention may include multiple portable consumer devices, consumers, issuers, notification devices, client computers, aggregators, etc FIG. 11 illustrates the data flow that a card activity alert service may use to implement its service.

At step 11 (1), consumer's 501 card is used to conduct a transaction with a merchant 503. This transaction may occur at the merchant's 503 store, over the internet, or via any other suitable means. In a typical transaction a consumer 501 may use the portable consumer device to make a purchase via a payment processing system 530. For example, the consumer may use a portable consumer device, such as a credit card, to pay $5000 for a flat screen television.

At step 11(2), once the consumer 501 uses the portable consumer device (e.g., swipes his credit card at a merchant), an authorization request message passes to the payment processing system 530 from the merchant 503. The payment processing system 530 then checks to see if the characteristics of the transaction that has been made with the portable consumer device matches a condition (e.g., notification event trigger) under which a consumer wants to be alerted. In the embodiment illustrated in FIG. 11, this check is made with the issuer 550 of the consumer's 501 portable consumer device.

As discussed above, there are a number of examples of notification event triggers. Examples of notification event triggers include the following: a transaction is over a certain amount of money (e.g. over $5000); any transaction conducted with a particular portable consumer device; a spending threshold (e.g., a daily or monthly spending limit) has been reached for a particular portable consumer device; a transaction is made outside a particular geographic location (e.g., outside the country that the consumer resides in); a risky transaction is being conducted ("risky" may be predefined by the consumer and/or the issuer), a transaction is made without the physical portable consumer device (e.g., Internet, mail, or telephone order); a cash transaction or withdrawal; an online account has been accessed; a person has used the portable consumer device to enter a certain location (e.g., a secure area, a business after-hours); a payment is due within a certain amount of time; a payment is overdue; a child or spouse has conducted a transaction; a balance on the portable consumer device is exceeded; a particular type of transaction is being conducted (e.g., purchases for airline tickets, lodging, auto rental, restaurants, medical, etc.), etc. Thus, is system is flexible enough to allow for many types of notification event triggers.

If there is no notification event trigger, then the notification process ends. If there is a notification event trigger, the payment processing system sends the trigger information to the application server 522(a) in the gateway service platform 520 as illustrated at step 11 (3). The application server 522(a) may check the SQL DB Server 523(a) to see how (or even if) the consumer 501 would like to be notified about the transaction. If the consumer 501 does not want to be alerted about this particular type of transaction, the notification process ends.

If the consumer 501 would like to be notified about this particular type of transaction, then an alert is then sent to the consumer 501 via the communication mode (e.g., via a specific communication channel) specified by the consumer 501. Examples of communication modes include voice, mobile, SMS, e-mail, instant message, etc. In the embodiment illustrated in FIG. 11, an alert is sent to the consumer 501 via a text message that passes through the telecommunication gateway 521 (a).

As noted above, consumer 501 may specify one or more communication mode per notification event trigger. For example, a consumer 501 may want to be notified when a purchase is made that is over $5000 by mobile phone and e-mail. In addition, a consumer 501 may specify one or more contacts for each communication mode. For example, a consumer 501 can have multiple mobile numbers (e.g., the consumer's personal mobile phone, work mobile phone, spouse's mobile phone number), multiple phone numbers (e.g., home phone, work phone), multiple SMS addresses (e.g., mobile phone, PDA, secretary's PDA), or multiple e-mail addresses (e.g., work e-mail, personal e-mail), etc. A consumer 501 may also customize the time that he wants to receive each or all alerts. For example, the consumer 501 may want to be notified immediately of the transaction, only during certain hours (e.g., between 9 a.m. and 5 p.m.), may specify different communication modes for different times of the day or types of transactions, or may choose not to be notified during certain hours (e.g., between 1 a.m. and 6 a.m.).

A consumer 501 can specify that he wants to receive a notification if his portable consumer device is used for a transaction over a certain amount of money (e.g., over $5000), via his work phone number and spouse's e-mail if it is during the day, and by SMS and home phone if the transaction occurs on the evening or weekend.

A consumer 501 may also want the alert to be escalated if the alert was not received. An alert may not be received if it could not be delivered (e.g., the mobile phone network was down or the consumer's number has been de-listed), or the consumer does not acknowledge the alert message within a certain time (e.g., respond to the message, listen to the voicemail, or open the SMS message or e-mail). A status message regarding whether or not a consumer has received the alert can be sent to the application server 522(a) in the SQL DB Server 523(a). The application server 522(a) evaluates whether or not the alert should be escalated (e.g., whether the alert was received and whether the consumer has specified that he wants the alert to be escalated). If the alert was not received, then the application server 522(a) can retry the same communication mode or try a different communication mode based on the consumer preference or default settings. For example, a consumer may have an alert set for a purchase made out of the country in which he resides. He may want the alert be sent to his PDA that he generally carries with him. However, if he does not receive the message on his PDA either because the PDA service is down or he does not have it with him, he can specify that the alert then be sent to a different contact or to each of his other contacts until the system knows that he has received the alert.

The application server 522(a) may also include timers to send status messages so that the consumer 501 knows whether or not the portable consumer device has been used for a transaction. For example, a consumer 501 may want a timer that alerts him daily at 7 a.m. that he used portable consumer device twice the day before or for certain types of purchases made with the portable consumer device.

Further, the consumer 501 may want to be alerted if the portable consumer device is used to access a certain location. This can be characterized as an access transaction. For example, a portable consumer device can be an access device to gain entrance to a building or other location. An employee may enter a particular business after-hours or enter a secure area of that business. The consumer may want to receive an alert that the employee has used the portable consumer device to enter the secure area. For example, if Joe Employee enters the secure server room after business hours, the consumer may receive an SMS message on his mobile phone that says "Joe Employee has entered secure area A (the server room)."

The notification sent to the consumer 501 may also pass through an aggregator before being delivered to a consumer. The aggregator may be an entity or organization that receives and transmits messages to a phone, e-mail account, etc. In some cases, wireless telephone companies may be considered aggregators.

8. Balance Alert Services I

Figure 12:
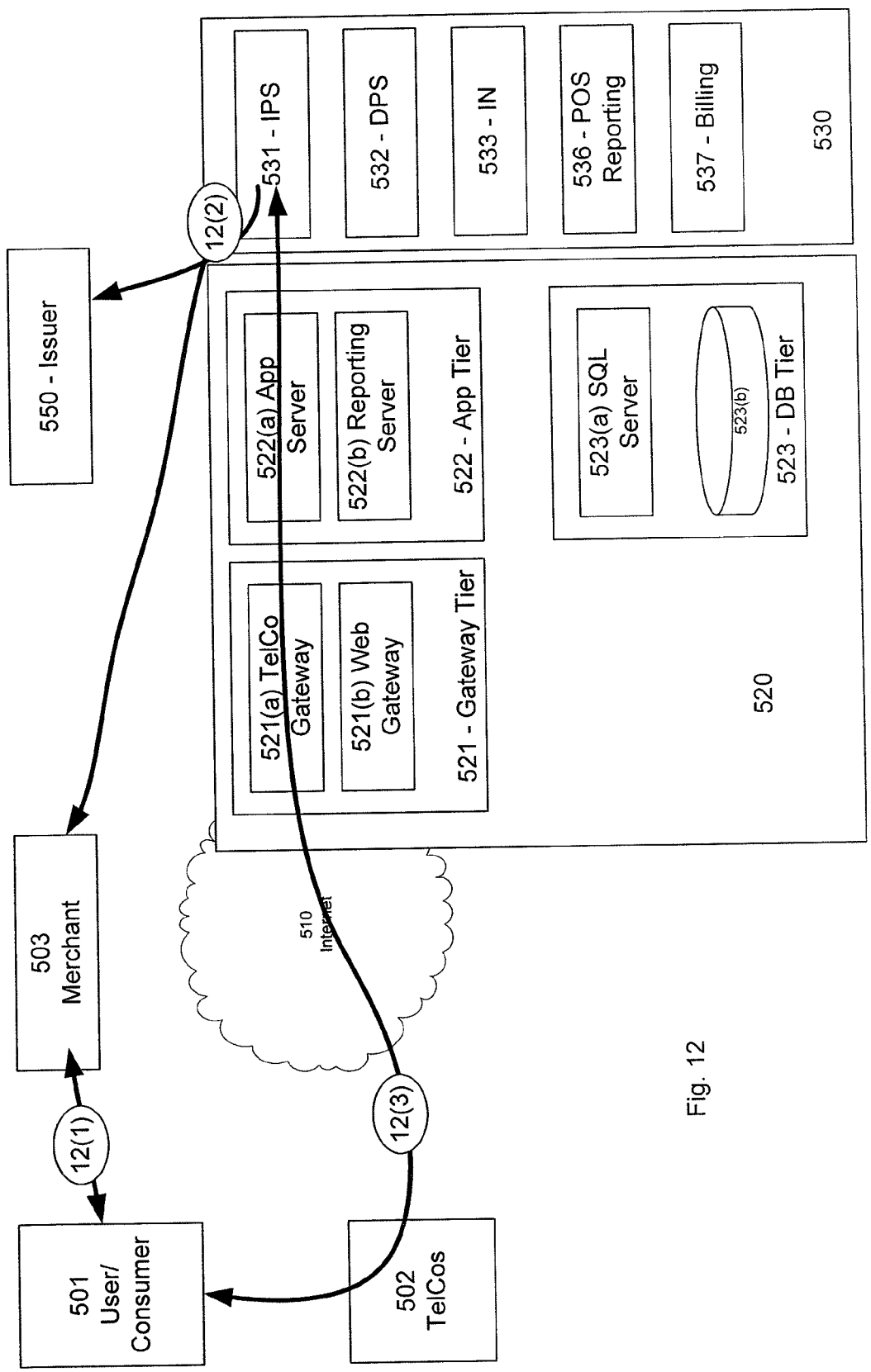
FIG. 12 illustrates the dataflow for a card alert service according to one embodiment.

FIG. 12 illustrates the dataflow for a card alert service according to one embodiment. U.S. patent application Ser. No. 11/963,736, describing a real-time balance update application, can also be referenced for additional information on other balance alert services.

A balance alert is in many ways similar to the activity alerts described above. A notification with dynamic data, such as a balance alert, can be triggered when the consumer requests the notification or when the consumer uses the portable consumer device. For example, balance alerts can be triggered off of IPS 531 activity or DPS 532 activity. The consumer can also have notifications automatically sent to the notification device on a periodic basis. Once the notification is triggered, dynamic data is retrieved and delivered to the notification device if the consumer is enrolled to receive the notification. An exemplary embodiment of a notification is a real-time balance update. The real-time balance update is a communication to notify consumer of the funds available (balance) on portable consumer device after the last transaction is accounted for. The balances may include account balances such as credit card account balances, stored value account balances, rewards balances, checking account balances, savings account balances, investment account balances, brokerage account balances, and other suitable account balances.

Certain embodiments of the invention may provide one or more technical advantages to issuers and consumers. One advantage to a consumer may be knowing their current balance or rewards available on their card without having to contact the issuer which could save time and could save the consumer money. Another advantage to a consumer may be that the consumer can request the current balance left on their card so that they can determine whether they have sufficient funds or credit to make a purchase or complete a transaction. An advantage to an issuer may be that automatic notifications are sent to consumers and issuer does not have to provide notifications by other means.

Similar to the activity alert service, the balance alert service can use any suitable notification device and means of notification. For example, suitable notification devices can be hand-held and compact so that they can fit into a consumer's wallet and/or pocket (e.g., pocket-sized). Some examples of notification device include desktop or laptop computers, cellular phones (e.g., as shown in FIG. 3), personal digital assistants (PDAs), pagers, payment cards, security cards, access cards, smart media, transponders, and the like. In some embodiments, notification device and portable consumer device are embodied in the same device. Some examples of suitable notifications includes a phone call, a voice message, a voicemail message, a short message service (SMS) message e.g. a text message, an instant messaging (IM) message, or an email message, or a periodically updated display on a device.

A balance alert may retrieve enrollment information with trigger information from a notification database using a database server. Notification server confirms that consumer is enrolled to receive the notification triggered based on the trigger information. Notification server retrieves the dynamic data from issuer or other suitable entity and sends the notification with the dynamic data through gateway to aggregator. Aggregator collects notifications according to enrollment information and forwards the notifications to notification device. If the notification triggered is associated with dynamic balance data, dynamic balance module processes the notification. If the notification triggered is associated with dynamic rewards data, dynamic rewards module processes the notification.

At step 12(1), consumer's 501 card is used to conduct a transaction with a merchant 503. This transaction may occur at the merchant's 503 store, over the internet, or via any other suitable means. In a typical transaction a consumer 501 may use the portable consumer device to make a purchase via a payment processing system 530.

At step 12(2), once the consumer 501 uses the portable consumer device (e.g., swipes his credit card at a merchant), an authorization request message passes to the payment processing system 530 from the merchant 503. After the transaction is authorized, the payment processing system 530 checks the current value of any dynamic data that is to be used in the balance alert. In the embodiment illustrated in FIG. 12, this check is made with the issuer 550 of the consumer's 501 portable consumer device.

The payment processing system 530 then sends a request to generate an alert using the dynamic information to the application server 522(*a*) in the gateway service platform 520 as illustrated at step 12(3). The application server 522(*a*) may check the SQL DB Server 523(*a*) to see how (or even if) the consumer 501 would like to be notified.

Just as with the card activity alerts described above, there are many different ways that the balance alert can be pushed out the consumer 501.

9. Balance Alert Services II

Figure 13:
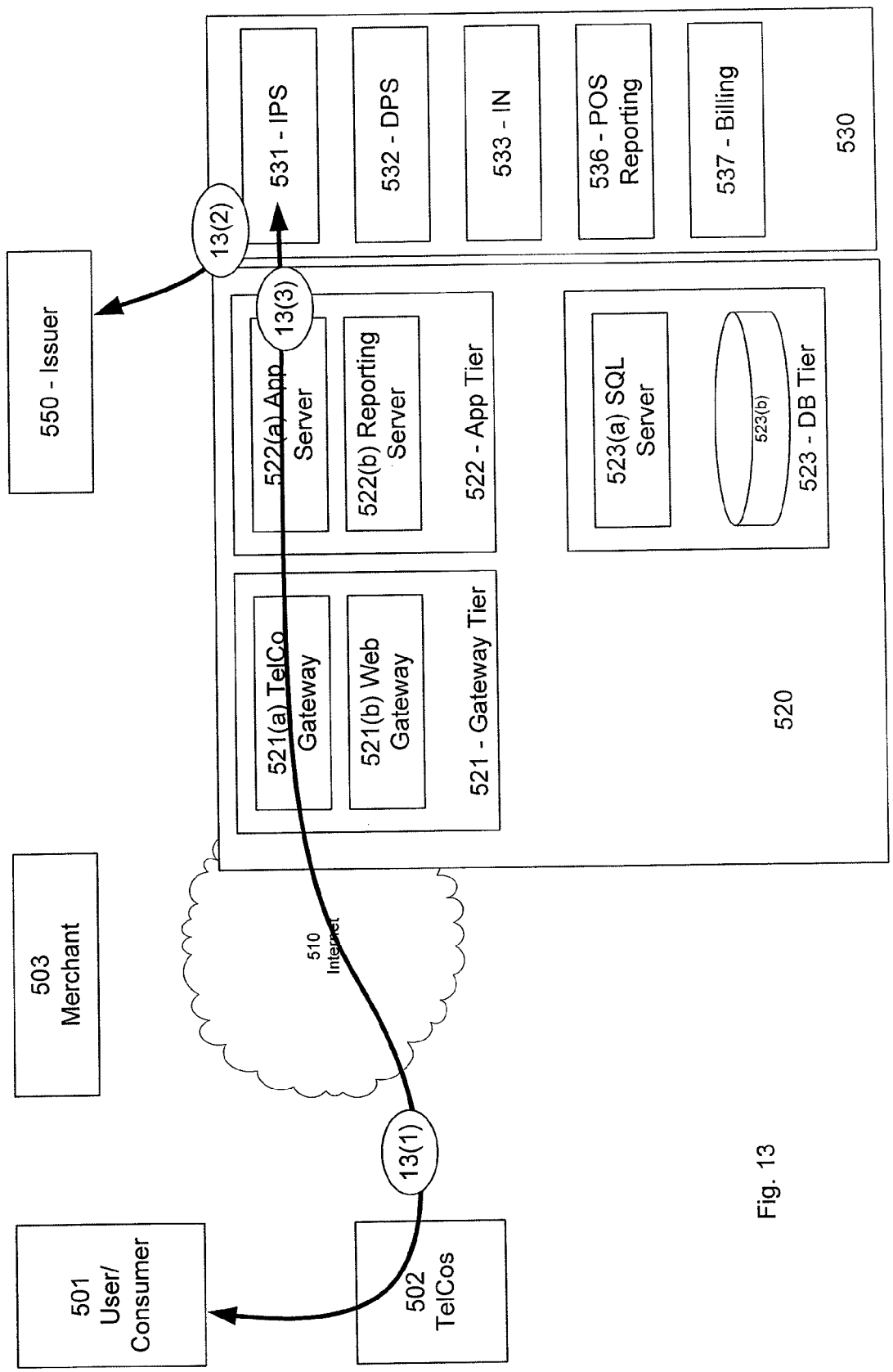
FIG. 13 illustrates the dataflow for a card alert service according to one embodiment.

FIG. 13 illustrates the dataflow for a card alert service according to one embodiment. In particular, FIG. 13 illustrates an example of the dataflow used to push out a balance alert at the request of a consumer.

At step 13(1), a consumer 501 sends text message to application server 522(*a*) requesting their balance As discussed in reference to many other gateway service platform services, this request passes through the appropriate networks and gateways to reach the application server 522(*a*). Once the request is received, the application server 522(*a*) validates the request. For example, the application server 522(*a*) may verify that the request was received from mobile phone associated with a valid account. The application server 522(*a*) may also lookup any additional information necessary to complete the request. For example, the application server 522(*a*) may lookup the account number associated with the portable consumer device that sent the request if the account number was not included in the request. Once the application server 522(*a*) has all of the necessary information, the balance request can be passed onto a payment processing system 530 or a subcomponent thereof such as IPS 531.

At step 13(2) the payment processing system 530 sends a request to the issuer 550 of the account to get the card balance of the account At step 13(3) a balance alert is sent to the gateway service platform 520, and the gateway service platform 520 forwards this alert to the consumer 501. Just as with other alert examples described above, there are many different ways that the balance alert can be pushed out the consumer 501.

10. Balance Alert Services III

Figure 14:
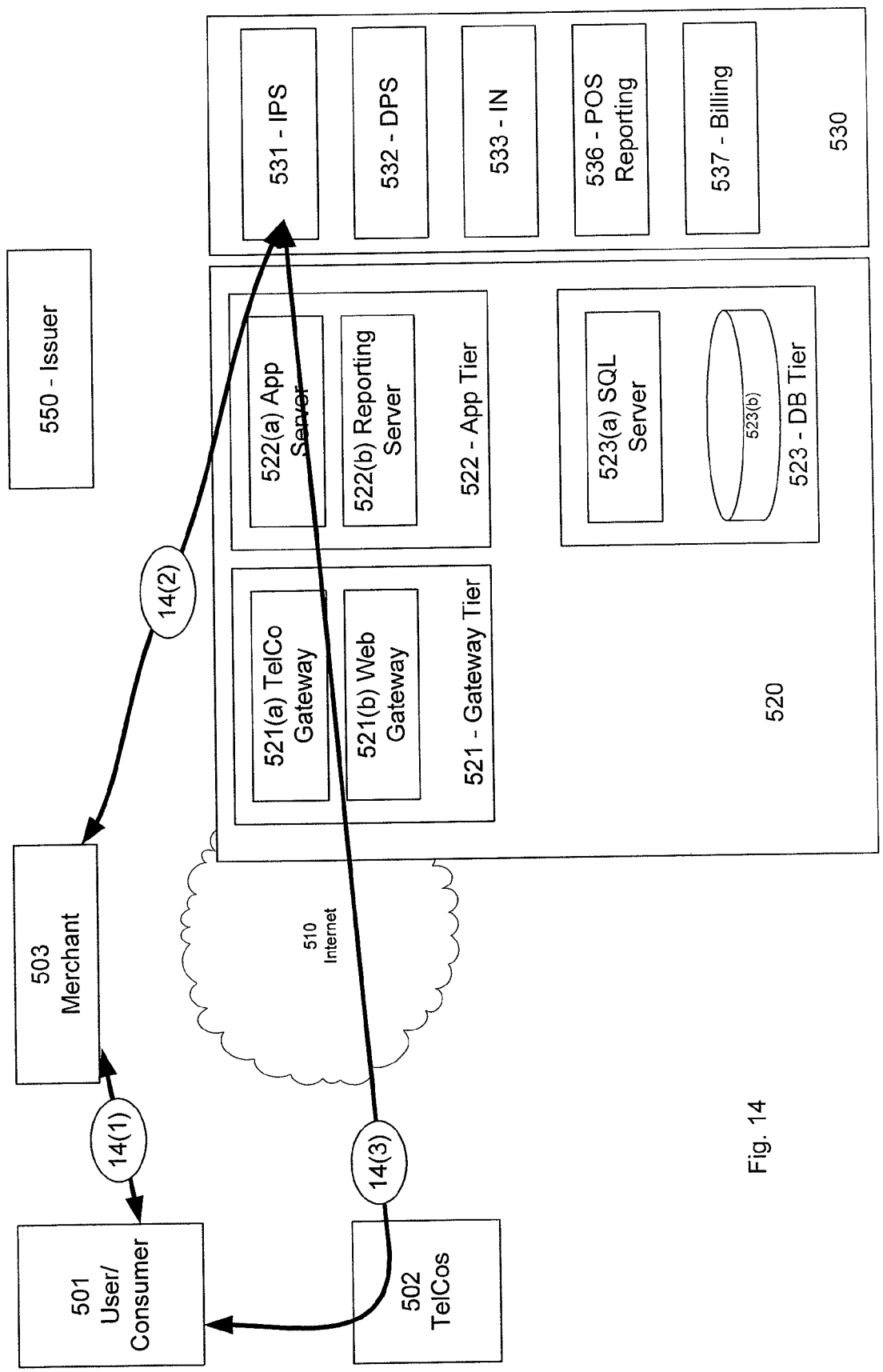
FIG. 14 illustrates the dataflow for a card alert service according to one embodiment.

FIG. 14 illustrates the dataflow for a card alert service according to one embodiment. In particular, FIG. 14 illustrates an example of the dataflow used to push out a balance alert on debit or prepaid card activity.

At step 14(1), consumer's 501 card is used to conduct a transaction with a merchant 503. This transaction may occur at the merchant's 503 store, over the internet, or via any other suitable means. In a typical transaction a consumer 501 may use the portable consumer device to make a purchase via a payment processing system 530.

At step 14(2), once the consumer 501 uses the portable consumer device (e.g., swipes his credit card at a merchant), an authorization request message passes to the payment processing system 530 from the merchant 503. In this example, the request is sent to DPS 532 and the account used to conduct the transaction either has the current prepaid balance, or the money is collected by DPS the issuer 550. After the transaction is authorized, the DPS 532 checks the current value of any dynamic data that is to be used in the balance alert. In the embodiment illustrated in FIG. 14, the DPS does not need to conduct any further checks to find the necessary dynamic data.

At step 14(3) DPS 532 generates an alert to the gateway service platform 520, which is delivered to the consumer 501. Just as with other alert examples described above, there are many different ways that the balance alert can be pushed out the consumer 501.

10. ATM Locator Service

Figure 15:
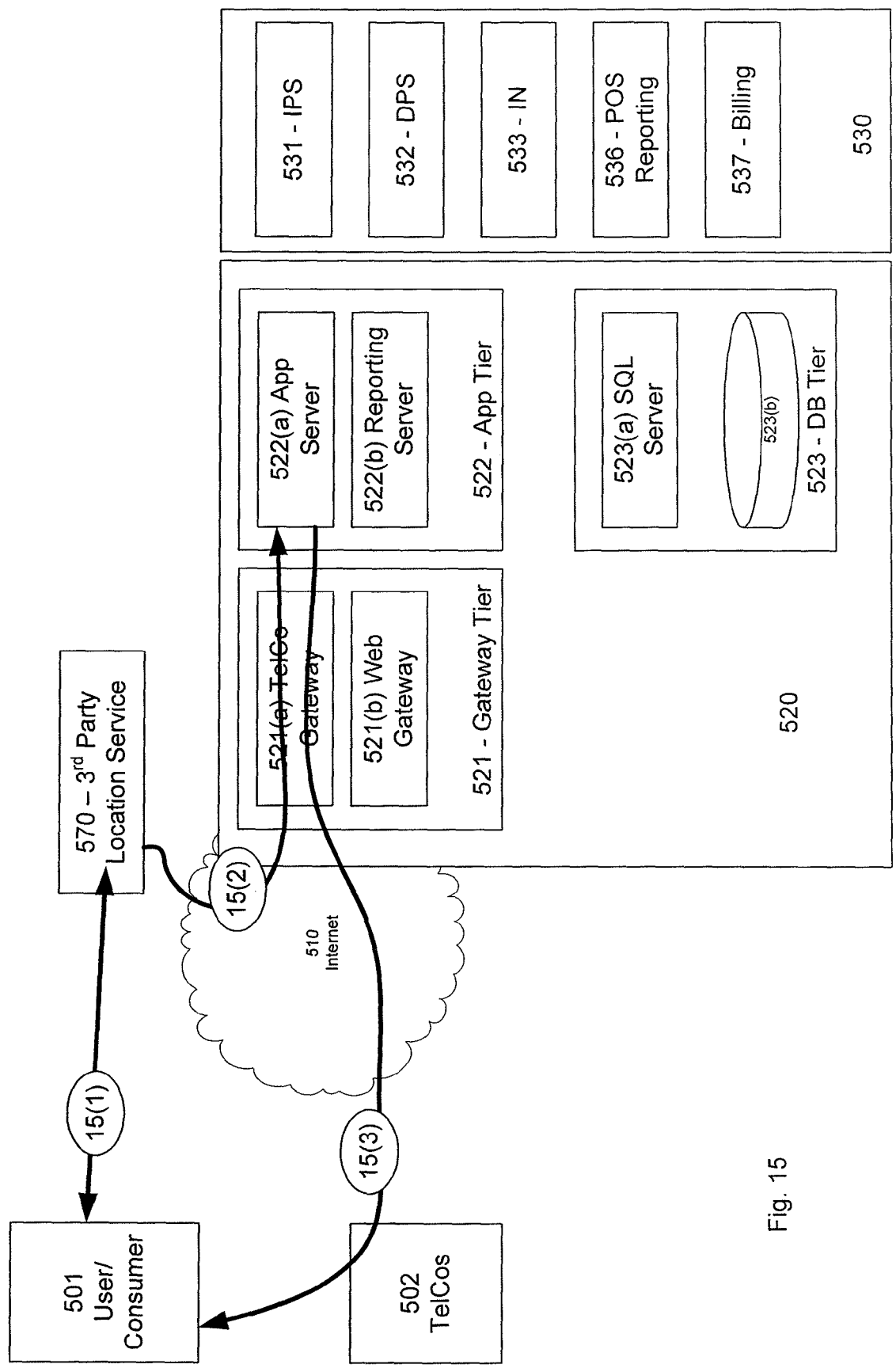
FIG. 15 illustrates the dataflow for a ATM Locator service according to one embodiment.

FIG. 15 illustrates the dataflow for a ATM Locator service according to one embodiment.

At step 15(1), the consumer 501 submits a request for the location of an ATM to a third party location determining service 570. The request can be made over the internet using a computer or a portable consumer device, and the response can be received on the same device or on a different device. Consumer 501 may provide an address, zip code, mobile number, or other information that can be used to help locate the consumer 501.

The location of the consumer 501 can be determined in any suitable manner. For example, in one embodiment, a consumer 501 may use an ATM locator on a website (e.g., an issuer's website) to search for one or more available ATMs in a particular location. Alternatively, the current location of the consumer 501 can be determined automatically using a global positioning system (GPS) element on the consumer's mobile phone, in the consumer's car etc. Other location based methods, including the determination of mobile phone signal strength can be used to determine the consumer's location. Yet another location based determination method involves the use of a consumer's credit and debit cards. For instance, when a consumer 501 purchases an item from a particular merchant, a server computer in a payment processing system can determine the location of that merchant, and hence the location of the consumer.

Once the consumer's location is determined, a response can be sent to the consumer 501. At step 15(2), an ATM location, as computed by a location determining entity is sent to the gateway service platform 520 via a "sendSMS web service" exposed by the gateway service platform 520. Typically, client and server side certificates are used to help secure this communication between a third-party, such as a third party location determining service 570, and the gateway service platform 520. This communication is received by the application server 522(*a*).

At step 15(3), an alert with the ATM location is sent to the consumer 501. Just as with other alert examples described above, there are many different ways that an alert can be pushed out the consumer 501.

The above ATM location service is a good example of how $3^{rd}$ party services can leverage the gateway service platform 520 to send information out of to consumers 501. One skilled in the art will recognize that the ATM locator service could have alternatively been implemented within the application server 522(*a*), as the previous service examples were described.

11. IP Terminal Service

Figure 16:
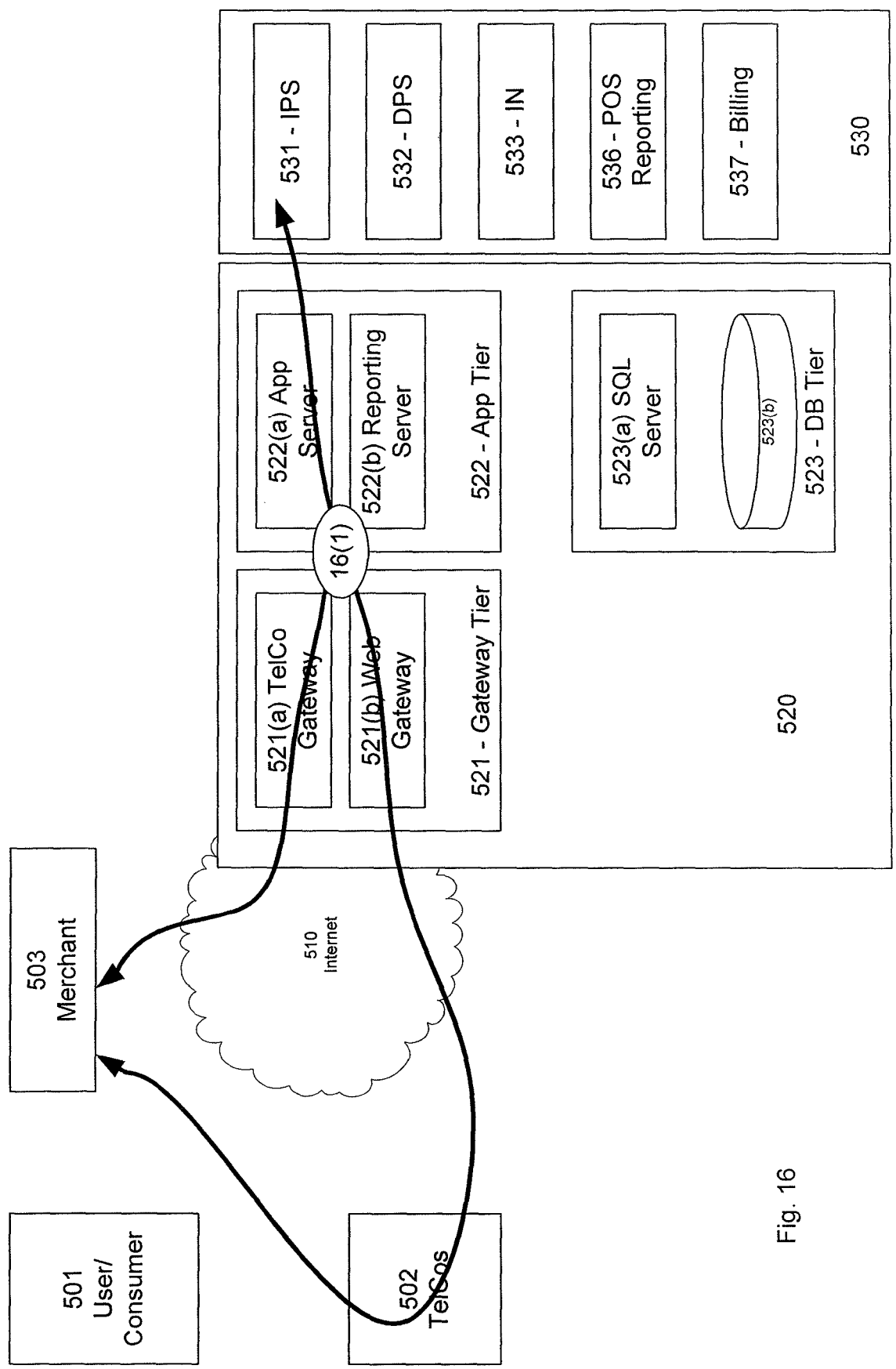
FIG. 16 illustrates the dataflow for an IP Terminal service according to one embodiment.

FIG. 16 illustrates the dataflow for an IP Terminal service according to one embodiment. U.S. patent application Ser. No. 11/536,296 describing a mobile transit fare payment application and U.S. patent application Ser. No. 12/022,060, describing a mobile device payment application, describe other payment applications that may use similar data flows as an IP terminal.

IP terminals can be embodied as access devices that can be used to process payments for purchase transactions. IP terminals are generally capable of communicating over the internet, telecommunication networks, or other similar networks. IP terminals are useful in areas where direct access to the closed network maintained by third-party payment processors is not easily available, but other open networks are easily available. For example, this situation exists in many places such as India and China.

The data flow for a standard (non-IP terminal) payment transaction is described later in this disclosure. As illustrated in FIG. 16, the gateway service platform 520 can help to facilitate payment transactions conducted using IP terminals since the gateway service platform 520 can directly receive payment authorization requests from the IP terminals used by merchants 503. As illustrated by data flow 16(1), payment authorization requests sent by IP terminals may be received over the internet 510 or from a telecommunication network 502. Different embodiments of IP terminals may also use other appropriate networks. Once the application server 522(*a*) in the gateway service platform 520 receives this authorization request, the request can be forwarded to a payment processing system 530 and handled just like any other payment request. The response to the payment request can then be sent back through the gateway service platform 520 to the IP terminal of the merchant 503.

12. Passive Enrollment Service

Figure 17:
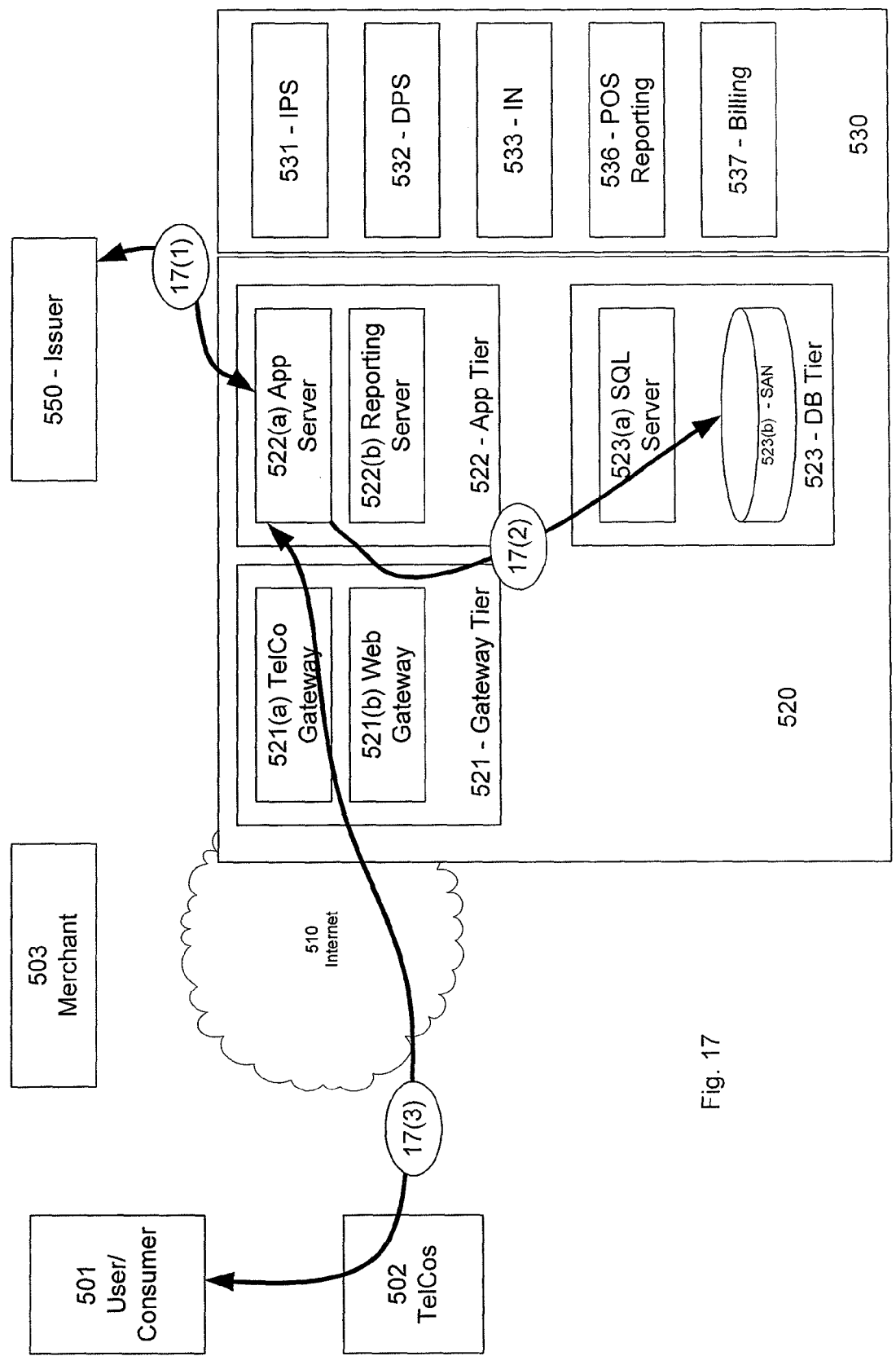
FIG. 17 illustrates the dataflow for a passive enrollment service according to one embodiment.

FIG. 17 illustrates the dataflow for a passive enrollment service according to one embodiment.

Typically enrollment into any service offered by a gateway service platform can happen in a number of ways. According to one method, consumers may enroll themselves into a service using the web or a mobile device. This is an example of an active enrollment method.

Another enrollment method is for the gateway service platform is where an issuer enrolls its users for services offered by the gateway service platform without the users taking any affirmative actions themselves. This is referred to as passive enrollment, and an example of a dataflow used during a passive enrollment process is illustrated in FIG. 17.

At step 17(1), an issuer 550 provides an enrollment file for a service. The enrollment file may contain information for all of the issuer's users, or it may only contain a list of enrollment changes. This enrollment file may be entered into the gateway service platform manually, or the file may be electronically parsed and processed.

At step 17(2), the enrollment file is validated by the application server 522(*a*). If the file does not contain any errors, the entries in the file are stored within the database tier 523. The issuer 550 can be notified of any errors contained in the enrollment file.

At step 17(3), user 501 can complete the enrollment process via SMS activation or Web activation. In some embodiments user completion may not be necessary. However, user confirmation can serve a security purpose and help to further validate the information supplied by the issuer. Once registration is complete, contact information of the consumer can be shared with other systems that require the information.

13. Exemplary Integrated Services

One of the benefits offered by embodiments of the present invention is the ability to more quickly integrate various features of services to provide new functionality for users. Integration becomes easier because services and applications can easily share resources, such as data in databases, share connections to networks, such as the internet or payment processing networks, and communicate with each other without having to navigate through firewalls, routers, and other pieces of basic infrastructure that might exist between implementations of different services. Another advantage of integrating services and applications at the gateway service layer is that since the gateway service layer can communicate with many different issuers, merchants, and other parties, the gateway service layer is in a good position to combine data from many different sources that might not otherwise be easily aggregated. For example, if a consumer has multiple credit cards with different issuers, services implemented and integrated with each other at the gateway service layer can access all of this data and provide a greater range of services. There are many possible ways in which services and applications, such as the ones described above, can be integrated with each other to quickly provide new functionality to services without having to re-implement large sections of existing services.

In one example of an integrated service, one skilled in the art could integrate a challenge-response service with a P2P service. Such an integrated service would enable a payor to authorize a P2P transaction by responding with a ZIP code, or other piece of personal account information, rather than an established PIN.

Another example of an integrated service would be the integration of a couponing/offer service with a balance notification service. The balance monitoring modules of a balance notification service can be used to trigger when various coupons or other offers are made available to users. Similarly, the triggers associated with a card activity service could also be integrated with a couponing service.

In yet another example, activity on a first credit card held by a first issuer can trigger a coupon or offer available through a second credit card held by a different issuer. Not only are aspects of different services combined (activity alerts and couponing), but the features are able to span multiple consumer accounts held by different issuers. Similarly, merchants and issuers may be able to take advantage of the aggregation of data at the gateway service platform for other services.

The number of different ways that services and applications can be integrated with each other is nearly endless. The above combination examples are meant to be illustrative, and not exhaustive. It would be nearly impossible to describe every permutation of how difference services can be integrated or combined. Additionally, although not explicit above, it is clear that more than two services may be combined to implement new features. One skilled in the art will recognize that any possible integration or combination of services will be easier to implement using the gateway service platform than prior service implementation techniques, such as the Silo Method.

II. Exemplary Payment Processing System

A. Payment Processing System

Figure 18:
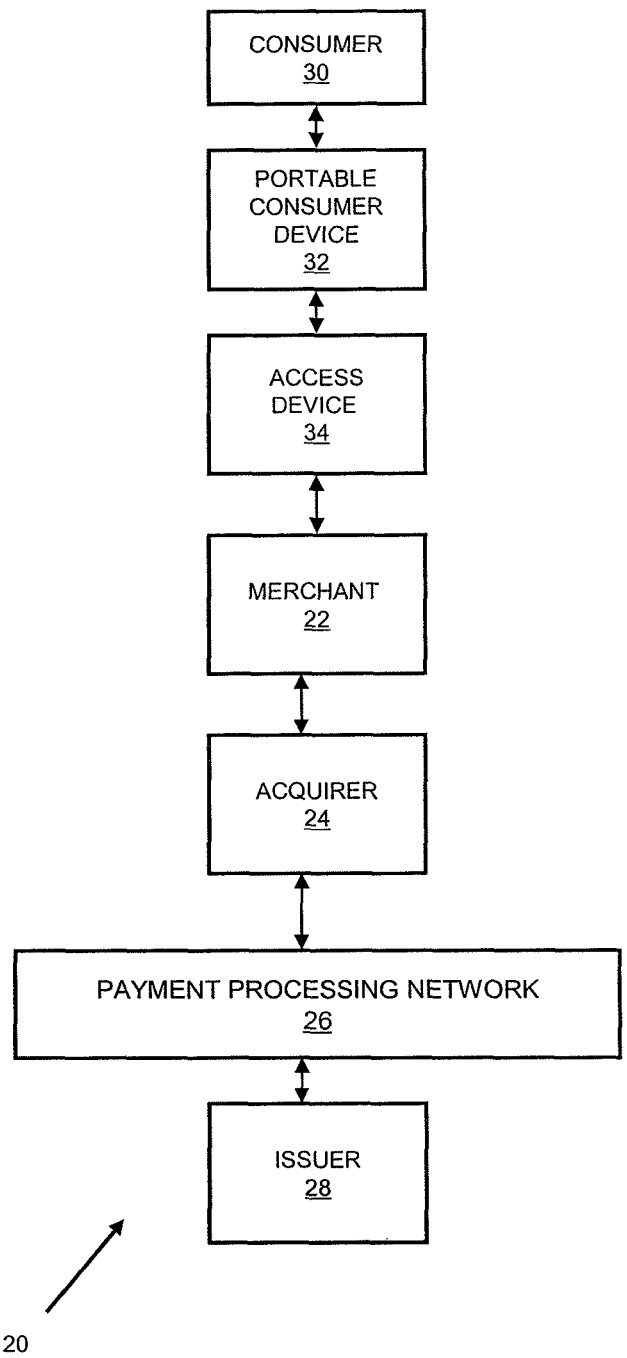
FIG. 18 shows a diagram of an exemplary payment processing system.

FIG. 18 shows various components and systems that are typically used to conduct a payment transaction using a payment processing system. Many of these components have been briefly described earlier in this disclosure and are more fully described below. As previously described, the gateway service platform and the services and applications that it enables are often integrated with a payment processing network (sometimes referred to as a payment processing system) to provide various pieces of functionality to users, merchants, and other relevant parties. The description of a payment processing system as described below helps to further put into context the various modules, actors, and other components of a payment processing system so that how such as system might interact with a gateway service platform becomes more readily apparent. Other payment processing systems, according to other embodiments of the invention, may include more or less components than are shown in FIG. 18.

The system 20 shown in FIG. 18 includes a merchant 22 and an acquirer 24 associated with the merchant 22. In a typical payment transaction, a consumer 30 may purchase goods or services at the merchant 22 using a portable consumer device 32. The merchant 22 could be a physical brick and mortar merchant or an e-merchant. The acquirer 24 can communicate with an issuer 28 via a payment processing system 26. The merchant 22 could alternatively be connected directly to the payment processing system 26. The consumer may interact with the payment processing system 26 and the merchant through an access device 34.

As used herein, an "acquirer" is typically a business entity, e.g., a commercial bank that has a business relationship with a particular merchant or an ATM. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card). According to some embodiments, a computer or other similar device can be used in place of a portable consumer device to achieve the same functionality as the portable consumer device.

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. As described earlier, some access devices may interact with the payment processing network via the gateway service platform over a network such as the internet. The card readers may include any suitable contact or contactless mode of operation. For example, exemplary card readers can include RF (radio frequency) antennas, magnetic stripe readers, etc. to interact with the portable consumer devices 32.

The access device 34 may also be a wireless phone. In one embodiment, the portable consumer device 32 and the access device are the same device. For example, a consumer may use a wireless to phone to select items to buy through a browser.

When the access device 34 is a personal computer, the interaction of the portable consumer devices 32 may be achieved via the consumer 30 or another person entering the credit card information into an application (e.g. a browser) that was opened to purchase goods or services and that connects to a server of the merchant, e.g. through a web site. In one embodiment, the personal computer may be at a checkout stand of a retail store of the merchant, and the application may already be connected to the merchant server.

Payment processing system 26 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes an IPS system, such as the Visa Integrated Payments system, which processes authorization requests and a Base 11 system which performs clearing and settlement services.

The payment processing system 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing system 26 may use any suitable wired or wireless network, including the Internet.

The issuer 28 may be a bank or other organization that may have an account associated with the consumer 30.

Embodiments of the invention are not limited to the above-described embodiments. For example, although separate functional blocks are shown for an issuer, payment processing system, and acquirer, some entities perform all or any suitable combination of these functions and may be included in embodiments of invention. Additional components may also be included in embodiments of the invention.

In a typical purchase transaction, the consumer 30 purchases a good or service at the merchant 22 using a portable consumer device 32 such as a credit card. An authorization request message is then forwarded to the acquirer 24. After receiving the authorization request message, the authorization request message is then sent to the payment processing system 26. The payment processing system 26 then forwards the authorization request message to the issuer 28 of the portable consumer device 32.

After the issuer 28 receives the authorization request message, the issuer 28 sends an authorization response message back to the payment processing system 26 to indicate whether or not the current transaction is authorized (or not authorized). The transaction processing system 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the POS terminal, or may be printed out on a receipt.

The system 20 in FIG. 18 typically resides on a closed network that is not accessible to the general public. For example, it is typically not possible for a consumer 30 or an issuer 28 to be able to connect to the system through the internet. A specialized connection normally needs to be configured for each entity wishing to connect to the system. Additionally, the messages that are exchanged between all of the entities in the system 20 typically are exchanged on the same closed network.

B. Consumer devices and computer apparatuses

Figure 19A:
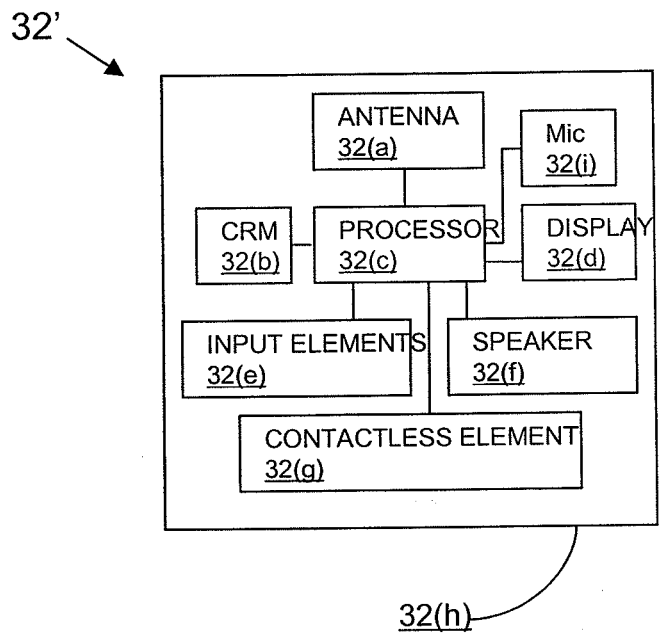
FIGS. 19(A) and 19(B) show diagrams of exemplary portable consumer devices.
Figure 19B:
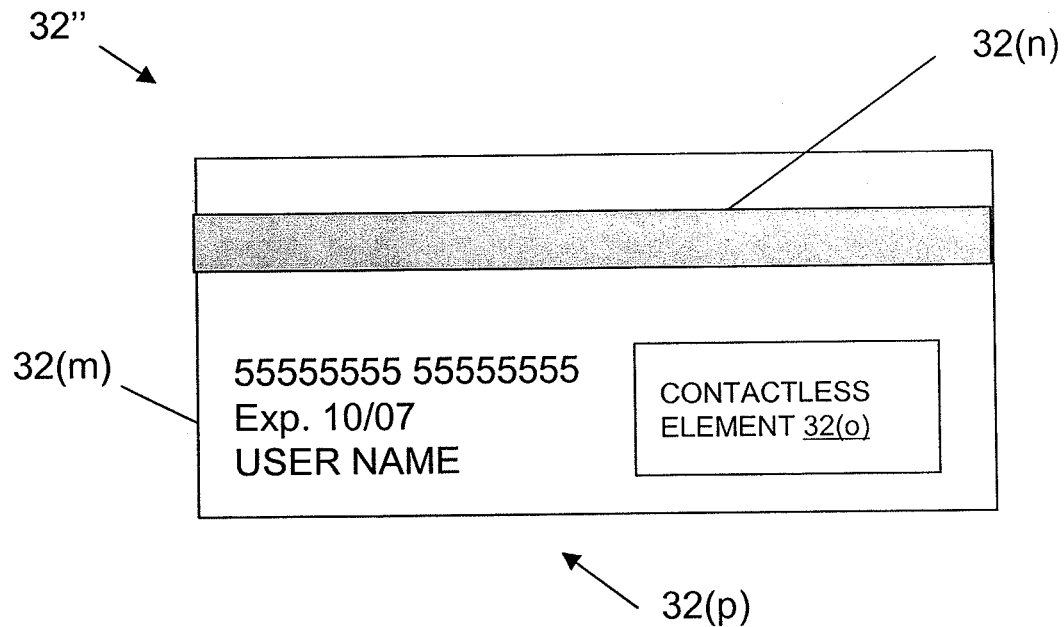

FIGS. 19(a)-19(b) show block diagrams of computer devices and subsystems that may be present in computer apparatuses in systems according to embodiments of the invention. For example, the computer devices and subsystems described below may be the same as consumer devices 201 illustrated in FIG. 2 and used by User/Consumer 501 in FIGS. 4-17. As previously described, many of the services and applications use consumer devices and portable consumer devices to gather information from and communicate with consumers.

The consumer device 32 may be in any suitable form. For example, suitable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of consumer devices include cellular phones (e.g., the phone 34 described above), personal digital assistants (PDAs), pagers, payment cards, security cards, access cards, smart media, transponders, and the like. The consumer devices can also be debit devices (e.g., a debit card), credit devices (e.g., a credit card), or stored value devices (e.g., a stored value card). Other consumer devices may include personal computers, laptops, or other devices capable of communicating over the internet.

An exemplary consumer device 32' in the form of a phone may comprise a computer readable medium and a body as shown in FIG. 19A. (FIG. 19A shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The consumer device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The consumer device 32 may also include a processor 32(c) (e.g., a microprocessor) for processing the functions of the consumer device 32 and a display 32(d) to allow a consumer to see phone numbers and other information and messages. The consumer device 32 may further include input elements 32(e) to allow a consumer to input information into the device, a speaker 32(f) to allow the consumer to hear voice communication, music, etc., and a microphone 32(i) to allow the consumer to transmit her voice through the consumer device 32. The consumer device 32 may also include an antenna 32(a) for wireless data transfer (e.g., data transmission).

If the consumer device is in the form of a debit, credit, or smartcard, the consumer device may also optionally have features such as magnetic strips. Such devices can operate in either a contact or contactless mode.

An example of a consumer device 32" in the form of a card is shown in FIG. 19(b). FIG. 19(b) shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 19(b), the consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

Figure 20:
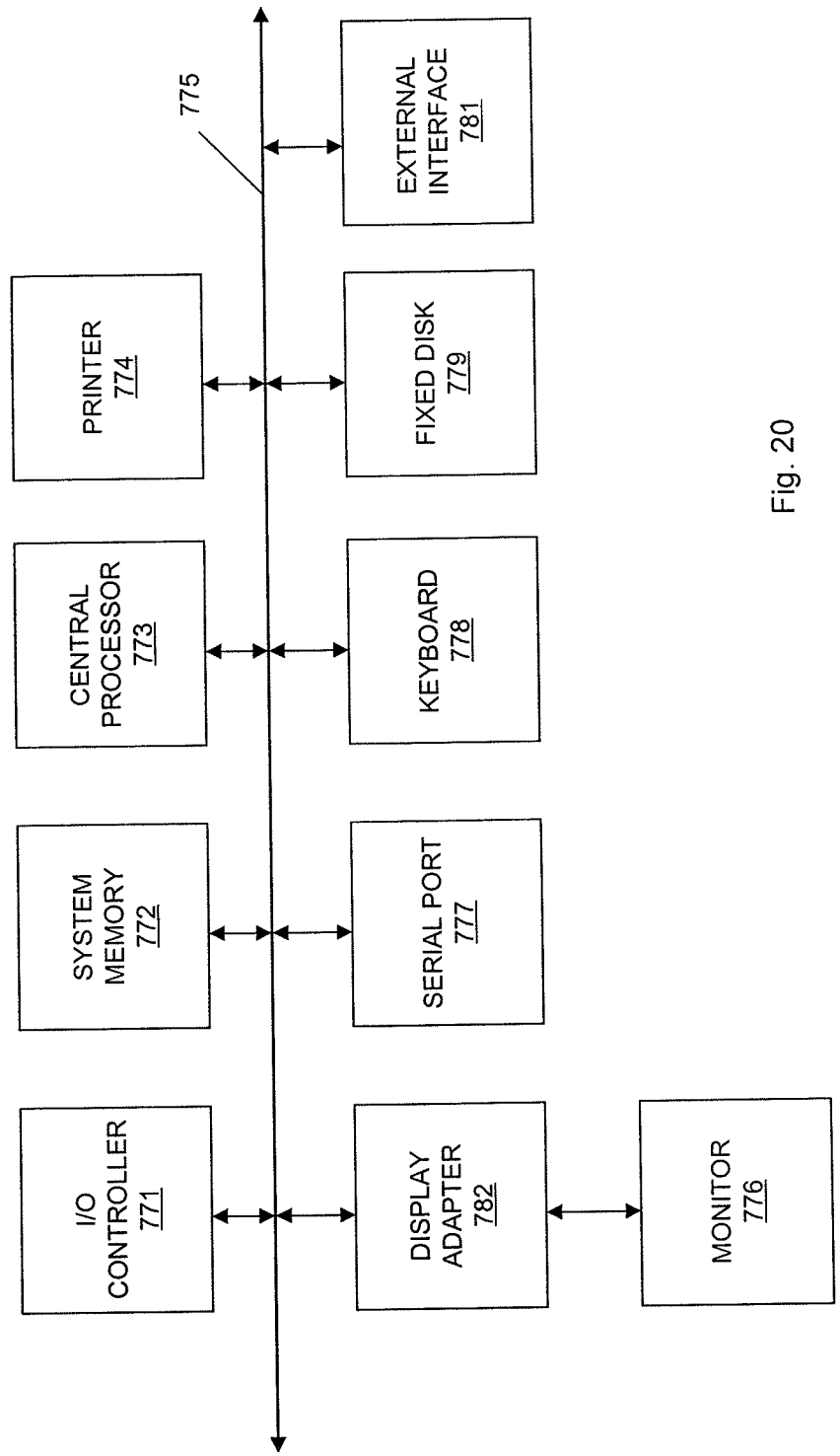
FIG. 20 shows a diagram of an exemplary system that can be used according to various embodiments.

The various participants and elements in FIG. 18, as well as the various components and systems that comprise embodiments of the gateway service platform, may operate one or more computer apparatuses to facilitate the functions described herein. Any of the elements in FIG. 18 may use any suitable number of subsystems to facilitate the functions described herein. Examples of such subsystems or components are shown in FIG. 20. The subsystems shown in FIG. 21 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform (e.g., Discover, AMEX, etc.) all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A gateway service system for providing services related to an account held by a user, the system comprising:
    a gateway tier configured to communicate with devices over one or more open networks, wherein the devices are configured to communicate with the gateway tier before communicating with an acquirer; and
    two or more service systems, wherein the two or more service systems are communicatively coupled to the gateway tier, wherein the two or more service systems are configured to communicate with devices over the one or more open networks via the gateway tier, wherein the two or more service systems are configured to communicate with a payment processing system, wherein the two or more service systems are configured to provide a plurality of services related to the account held by the user, wherein each of the two or more service systems further comprises an application tier and is configured to communicate with a shared database tier that is being shared amongst the two or more service systems, wherein each of the application tiers contain modules used to provide one or more services related to the account held by the user, and wherein the shared database tier stores information used to provide the one or more services related to the account held by the user, and wherein the two or more service systems are grouped into one or more service system groupings and wherein the one or more service system groupings are determined according to the one or more open networks used to connect the devices to the gateway tier and the devices used to connect to the gateway tier, wherein the one or more service system groupings include web services, terminal services, and mobile services;
    wherein the plurality of services are provided to users using devices connected to the one or more open networks.

2. The system of claim 1, wherein at least one of the two or more service systems communicates with the payment processing system in order to provide a service related to the account held by the user.

3. The system of claim 1 wherein the gateway service system is one of a plurality of gateway service systems.

4. The system of claim 1 wherein the plurality of services are provided to the user using a wireless portable consumer device.

5. The system of claim 1 wherein one of the plurality of services is provided to the user using a web browser.

6. The system of claim 1 wherein one of the plurality of services is provided to the user using an access device.

7. The system of claim 1 wherein one of the open networks is the internet.

8. The system of claim 1 wherein one of the open networks is a cellular network.

9. The system of claim 1 wherein at least two of the two or more service systems are integrated with each other, wherein at least one feature in one of the integrated service systems provides functionality for a second integrated service system.

10. A method for providing services related to an account held by a user, the method comprising:
    receiving at a gateway provided by a server computer a request from a device to access a service, wherein the request is received over an open network, wherein the devices are configured to communicate with the gateway tier before communicating with an acquirer;
    sending the request to a service system provided by a server computer, wherein the service system is one of a plurality of service systems communicatively coupled to the gateway, wherein the service system is communicatively coupled to a payment processing system, wherein the service system is configured to provide one or more of services related to the account held by the user, and wherein the service system further comprises an application tier and is configured to communicate with a shared database tier that is being shared amongst the plurality of service systems, wherein the application tier contains logic used to provide one or more services related to the account held by the user, and wherein the shared database tier stores information used to provide the one or more services related to the account held by the user, and wherein the plurality of service systems are grouped into one or more service system groupings and wherein the one or more service system groupings are determined according to the one or more open networks used to connect the devices to the gateway tier and the devices used to connect to the gateway tier, wherein the one or more service system groupings include web services, terminal services, and mobile services; and
    sending a response from the service system to the device.

11. The method of claim 10 wherein the service system communicates with the payment processing system in order to provide a service related to the account held by the user.

12. The method of claim 10 wherein the gateway is one of a plurality of gateways available to receive a request to access a service of the device.

13. The method of claim 10 wherein the service is provided to the user using a wireless portable consumer device.

14. The method of claim 10 wherein the service is provided to the user using a web browser.

15. method of claim 10 wherein the service is provided to the user using an access device.

16. The method of claim 10 wherein the open network is the internet.

17. The method of claim 10 wherein the open network is a cellular network.

18. The method of claim 10 wherein the service system is integrated with a second service system, wherein the one or more provided services related to the account held by the user uses features from the service system and the second service system.

19. A non-transitory computer-readable medium comprising:
    computer-executable code for receiving at a gateway provided by a server computer a request from a device to access a service, wherein the request is received over an open network, wherein the devices are configured to communicate with the gateway tier before communicating with an acquirer;
    computer-executable code for sending the request to a service system provided by a server computer, wherein the service system is one of a plurality of service systems communicatively coupled to the gateway, wherein the service system is communicatively coupled to a payment processing system; wherein the service system is configured to provide a plurality of services related to an account held by a user, and wherein the service system further comprises an application tier and is configured to communicate with a shared database tier that is being shared amongst the plurality of service systems, wherein the application tier contains logic used to provide one or more services related to the account held by the user, and wherein the shared database tier stores information used to provide the one or more services related to the account held by the user, and wherein the plurality of service systems are grouped into one or more service system groupings and wherein the one or more service system groupings are determined according to the one or more open networks used to connect the devices to the gateway tier and the devices used to connect to the gateway tier, wherein the one or more service system groupings include web services, terminal services, and mobile services; and computer-executable code for sending a response from the service system to the device.

20. The system of claim 1 wherein the plurality of services include at least two of the following: challenge response authentication, consumer to consumer payment, campaign rewards and promotions pushing, campaign rewards and promotions pulling, event registration and interaction, ATM locator, and account alerts and notifications.

21. The system of claim 1 wherein the mobile services include applications that use a mobile device, wherein web services include applications that use web browsers, and wherein terminal services include applications that use a payment terminal.

22. The system of claim 21 wherein the mobile services, web services, and terminal services include different combinations of applications.

23. The system of claim 1 wherein the two or more service systems include a value added service system, authentication service system, payment processing service system, and a cooperative processing service system.

* * * * *